(12) United States Patent
Fenoglio et al.

(10) Patent No.: US 9,386,086 B2
(45) Date of Patent: Jul. 5, 2016

(54) DYNAMIC SCALING FOR MULTI-TIERED DISTRIBUTED SYSTEMS USING PAYOFF OPTIMIZATION OF APPLICATION CLASSES

(71) Applicant: Cisco Technology Inc., San Jose, CA (US)

(72) Inventors: Enzo Fenoglio, Issy-les-Moulineaux (FR); Andre Surcouf, Saint Leu la Foret (FR); Fabien Andrieux, Gif-sur-Yvette (FR)

(73) Assignee: Cisco Technology Inc., San Jose, CA (US)

( * ) Notice: Subject to any disclaimer, the term of this patent is extended or adjusted under 35 U.S.C. 154(b) by 259 days.

(21) Appl. No.: 14/023,686

(22) Filed: Sep. 11, 2013

(65) Prior Publication Data

US 2015/0074679 A1    Mar. 12, 2015

(51) Int. Cl.
  *H04L 29/08* (2006.01)
  *G06F 9/50* (2006.01)
  *G06F 9/46* (2006.01)

(52) U.S. Cl.
  CPC .......... *H04L 67/1008* (2013.01); *G06F 9/505* (2013.01); *G06F 2209/5019* (2013.01)

(58) Field of Classification Search
  None
  See application file for complete search history.

(56) References Cited

U.S. PATENT DOCUMENTS

| | | | |
|---|---|---|---|
| 8,209,415 B2 | 6/2012 | Wei | |
| 2009/0307334 A1 | 12/2009 | Maltz et al. | |
| 2010/0220622 A1 | 9/2010 | Wei | |
| 2010/0223378 A1 | 9/2010 | Wei | |
| 2010/0250748 A1 | 9/2010 | Sivasubramanian et al. | |
| 2010/0268764 A1 | 10/2010 | Wee et al. | |
| 2010/0306767 A1 | 12/2010 | Dehaan | |
| 2011/0078303 A1* | 3/2011 | Li et al. | 709/224 |
| 2011/0119312 A1 | 5/2011 | Chopra et al. | |
| 2011/0258621 A1 | 10/2011 | Kern | |
| 2013/0174146 A1 | 7/2013 | Dasgupta et al. | |
| 2013/0346360 A1* | 12/2013 | Liu et al. | 707/609 |

OTHER PUBLICATIONS

Danilo Ardagna et al., "Flexible Distributed Capacity Allocation and Load Redirect Algorithms for Cloud Systems," (IEEE Int'l. Conf. Cloud Computing, Jul. 2011).

Danilo Ardagna et al., "A Game Theoretic Formulation of the Service Provisioning Problem in Cloud Systems," $20^{th}$ international conference on World wide web (WWW 2011, pp. 177-186, Apr. 1, 2011).

Ghalem Belalem et al., "An Effective Economic Management of Resources in Cloud Computing,"(*Journal of Computers*, vol. 6, No. 3, pp. 404-411 (Mar. 2011).

(Continued)

*Primary Examiner* — Eric C Wai
(74) *Attorney, Agent, or Firm* — Hahn Loeser & Parks, LLP

(57) ABSTRACT

In one embodiment, a method is described. The method includes: monitoring workloads of a plurality of application classes, each of the application classes describing services provided by one or more applications in a multi-tiered system and comprising a plurality of instantiated execution resources; estimating, for each of the application classes, a number of execution resources able to handle the monitored workloads, to simultaneously maintain a multi-tiered system response time below a determined value and minimize a cost per execution resource; and dynamically adjusting the plurality of instantiated execution resources for each of the application classes based on the estimated number of execution resources.

14 Claims, 12 Drawing Sheets

(56) References Cited

OTHER PUBLICATIONS

Jonathan Kupferman et al., "Scaling Into the Cloud" (CS270 Advanced Operating Systems), 2009.

A.A. Lazar, "Lecture 5: The Power Is an Optimization Control" (Feb. 14, 1995).

Chonho Lee et al., "An Evolutionary Game Theoretic Approach to Adaptive and Stable Application Deployment in Clouds," *5th International Conference on Bio-Inspired Models of Network, Information and Computing Systems* (Dec. 2010).

Richard T.B. Ma et al., "On Resource Management for Cloud Users: A Generalized Kelly Mechanism Approach" (May 2010).

Ming Mao et al., "Auto-Scaling to Minimize Cost and Meet Application Deadlines in Cloud Workflows," *Proceedings of 2011 International Conference for High Performance Computing, Networking, Storage and Analysis* (*SC '11*) (ACM 2011).

Giovanni Pacifici, "Managing The Response Time for Multi-Tiered Web Applications" (IBM 2005).

Andreas Pitsillides et al., "Dynamic Bandwith Allocation in Communication Systems: An Optimal Control Approach" (92CH 3179, pp. 632-635, IEEE 1992).

Nilabja Roy et al., "Efficient Autoscaling in the Cloud Using Predictive Models for Workload Forecasting," *Proceedings of the 2011 IEEE 4th Computing* (*CLOUD '11*), 2011.

Gerardo Rubino, "On Kleinrock's Power Metric for Queuing Systems" (IEEE 2011).

Junichi Suzuki et al., "Self-Stabilizable Symbiosis for Cloud Data Center Applications: A Game Theoretic Perspective," *6th Int'l Conference on Soft Computing and Intelligent Systems & 12th Int'l Symposium on Advanced Intelligent Systems* (*SCIS-ISIS*) (IEEE Nov. 12), 2012.

Hien Nguyen Van et al., "Autonomic Virtual Resource Management for Service Hosting Platforms," *Proceedings of the 2009 ICSE Workshop on Software Engineering Challenges of Cloud Computing* (*CLOUD '09*), 2009.

Fan Zhang et al., "Adaptive Virtual Machine Provisioning in Elastic Multi-Tier Cloud Platforms" (IEEE 2011).

\* cited by examiner

US 9,386,086 B2

DYNAMIC SCALING FOR MULTI-TIERED DISTRIBUTED SYSTEMS USING PAYOFF OPTIMIZATION OF APPLICATION CLASSES

TECHNICAL FIELD

The present invention relates to methods and apparatus for accelerating and dynamically scaling-out and/or scaling-in the infrastructure capacity in response to an application load demand change in a distributed cloud computing environment

BACKGROUND

Cloud computing is an emerging technology that is becoming more and more popular. This is primarily due to its elastic nature: users can acquire and release resources on-demand, and pay only for those resources needed in the form of virtual machines (VMs). Elasticity allows users to acquire and release resources dynamically according to changing demands, but deciding on the right amount of resources is a difficult task since cloud applications face large and fluctuating loads. In some particular and predictable situations such as sporting or daily events, resources can be provisioned in advance through capacity planning techniques. Unfortunately, most events are widely unplanned and characterized by unpredictable load spikes of the network traffic.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

Figure 1:
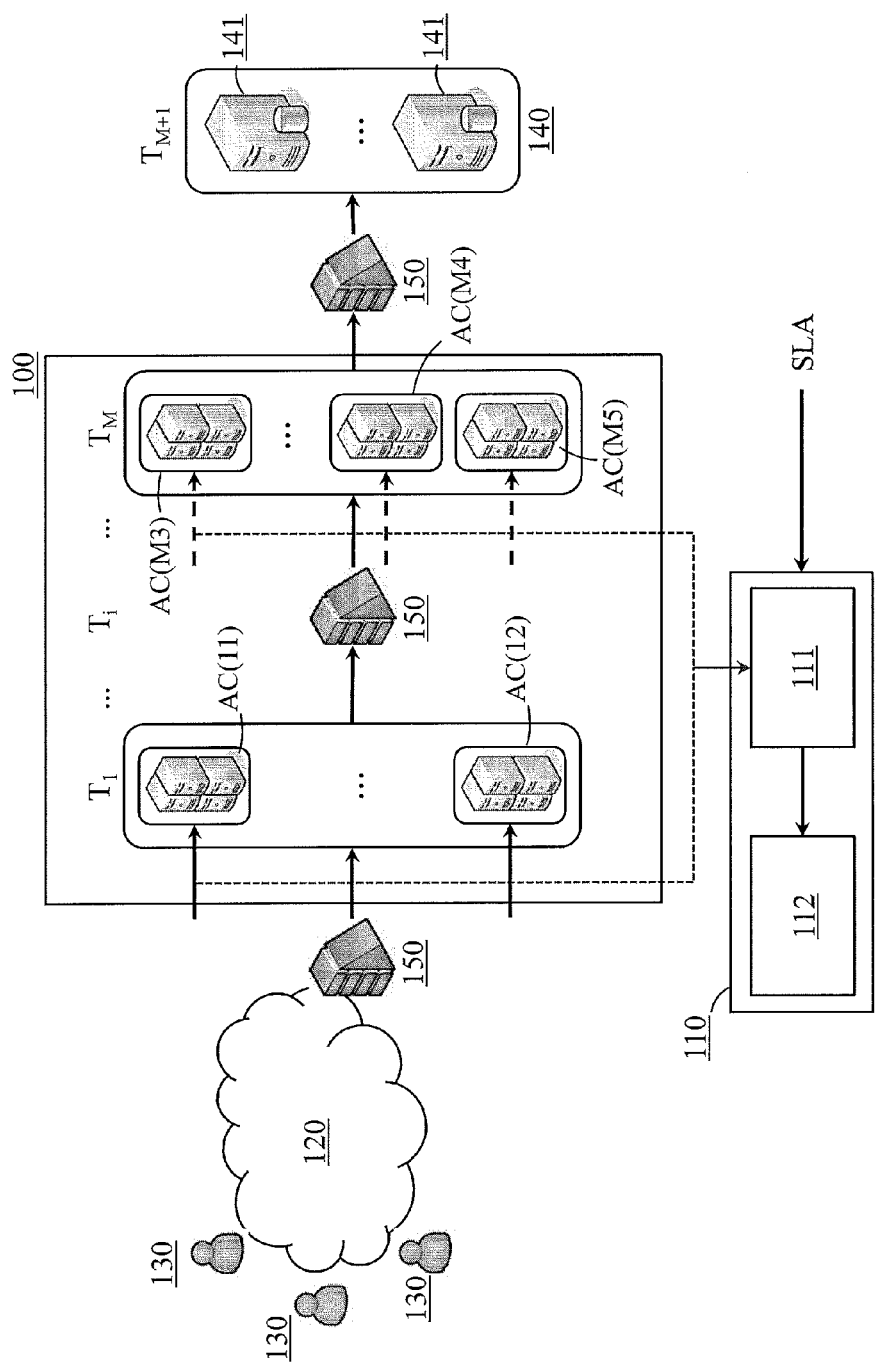
FIG. 1 is a simplified pictorial block diagram illustration of a multi-tiered system with multi-class tier application management in a cloud computing environment constructed and operative in accordance with an embodiment of the present invention.

In one embodiment, a method is described. The method includes: monitoring workloads of a plurality of application classes, each of the application classes describing services provided by one or more applications in a multi-tiered system and including a plurality of instantiated execution resources; estimating, for each of the application classes, a number of execution resources able to handle the monitored workloads, to simultaneously maintain a multi-tiered system response time below a deter mined value and minimize a cost per execution resource; and dynamically adjusting the plurality of instantiated execution resources for each of the application classes based on the estimated number of execution resources.

Example Embodiments

Existing cloud infrastructures are providing some auto-scaling capabilities allowing a cloud infrastructure to scale up or down its processing capacity according to the infrastructure workload. Usually, this scaling capability is associated with the load balancing capability. The load balancer distributes the incoming requests against a group of machines (e.g. virtual and/or physical machines for instance) implementing a particular application or a set of applications. Typically, an auto-scaler receives incoming load information from the load balancer as well as further information, such as, for example but not limited to, CPU load from the running machines. The auto-scaler then uses the received information and combines it together to manage creation of new machines (scale-out) or destruction of existing running machines (scale-in). This solution is well-suited in situations where a given group of machines is connected to a load balancer and executes one or more applications.

However, real deployed systems are typically made of more than one application or group of applications thus resulting in different groups of machines. The scaling feature described hereinabove still works individually for each group of machines (i.e. implementing a particular application or group of applications) but does not "understand" the global system structure and dependencies between the different groups of machines. In a situation where one group of applications (A) is interacting with another group of applications (B), any load increase on (A) automatically causes a load increase on (B). However, since (A) and (B) are different groups of applications, they are typically load balanced and scaled independently. Consequently, (B) is reacting to the load increase on (A) too late causing some (A) performance degradation even though (A) was scaled-out on time. To solve this issue, (B) is over provisioned most of the time so that input load increases on (A) do not instantly saturate (B).

The present invention, in embodiments thereof, relates to methods and apparatus for accelerating and dynamically scaling-out and/or scaling-in the infrastructure capacity in response to an application load demand change in a distributed cloud computing environment. An auto-scaler, independent from the hosting cloud infrastructure, which knows the functional dependencies between the different application groups, is provided. This knowledge of the system structure, combined with traditional activity monitoring from load balancers and running machines, allows implementation of an intelligent scaling-out/in mechanism where the cost can be minimized (by reducing over provisioning) and system performance can be maintained. Also, having a single scaling control point enables anticipation of peak hours and therefore each application group can be independently scaled-out in advance in a coherent manner. The present invention, in embodiments thereof, further provides some auto adaptive capability and is therefore able to react differently to different usage patterns while maintaining global system performance.

The meanings of certain abbreviations and symbols used herein are given in Table 1.

TABLE 1

Abbreviations and Symbols

| | |
|---|---|
| i | Tier identification index, defined as i: 1 to M. |
| j | Execution resource identification index within an application class, defined as j: 1 to $n_i(k)$. |
| k | Application class identification index. |
| $n_i(k)$ | Number of execution resources within a same application class for the i-th tier, defined as $n_i(k)$: 1 to $n_i(k)$. |
| AC(k) | Application class (k). |
| $\lambda_i^a(k), \lambda_i(k)$ | Request arrival rate for application class (k) at the i-th tier. When the superscript is not present, it shall be assumed that it refers to the arrival rate. |
| $\lambda_i^d(k)$ | Request departure rate for application class (k). |
| $\Lambda_i^a$ | Aggregated request arrival rate at the i-th tier. |
| $\Lambda_i^d$ | Aggregated request departure rate at the i-th tier. |
| $\rho_i(k)$ | System utilization for application class (k). |
| $\mu_j(k)$ | Request service rate for application class (k) for the j-th execution resource. |
| $\hat{\mu}_j$ | Average request service rate for the j-th execution resource. |
| C(k) | Computational capacity for the appliation class (k). |
| $R_i(k)$ | Average response time for application class (k) for the i-th tier. |
| $\hat{R}_i$ | Average response time for the i-th tier. |
| R | End-to-end average response time. |
| $N_i^{max}(k)$ | Maximum capacity of execution resources for application class (k) $\forall k \in T_i$ within the i-th tier. |
| $N_i^{min}(k)$ | Minimum capacity of execution resources for application class (k) $\forall k \in T_i$ within the i-th tier. The default configuration value is 1. |
| $T_i$ | The i-th multiclass tier. |
| $\beta(k)$ | Time unit cost for execution resources used for application class (k). |
| $NPM_i(k)$ | Network power metric for application class (k) belonging to the i-th tier. |

Reference is now made to FIG. 1, which is a simplified pictorial block diagram illustration of a multi-tiered system with multi-class tier application management in a cloud computing environment constructed and operative in accordance with an embodiment of the present invention.

The multi-tiered system 100 includes clients 130 accessing applications distributed on a plurality of tiers (T1, ..., TM) through a communications networks 120 (such as for example, but not limited to, a wide area network, the Internet, etc.). In such a multi-tiered system 100, a front end tier T1 receives the different client requests and then either processes them or forwards them to a subsequent tier Ti. As shown in FIG. 1, the multi-tiered system 100 may comprise a plurality of tiers (T1, ..., TM): a first tier (also referred as a front end tier T1), several intermediate tiers (including at least a tier Ti) and a last tier (also referred as a back end tier TM). For simplicity of description and depiction, and without limiting the generality of the invention, only two tiers (the front end T1 and the back end tiers TM) have been drawn in FIG. 1. However, those skilled in the art will appreciate that any appropriate number of tiers may be implemented. Each tier provides some functionality to its preceding tier and also uses some functionality provided by its successor to carry out its part of processing the client requests.

The multi-tiered system 100 of FIG. 1 includes applications that are typically hosted and run on execution resources such as virtual or physical machines or even mechanical apparatus. For simplicity of description and depiction, and without limiting the generality of the invention, execution resources and VMs (Virtual Machines) will be used interchangeably hereinafter in the present specification. A VM typically emulates a physical computing environment, but requests for Central Processing Unit (CPU), memory, hard disk, network and other hardware resources are managed by a virtualization layer which translates these requests to the underlying physical hardware. These applications such as for example, but not limited to, television applications, web applications, etc. are designed according to a flexible and modular approach in order to be implemented in such a multi-tiered system 100. Consequently, an application may be distributed in one or more tiers. For example, but without limiting the generality of the invention, a client request related to a particular television application may be served by a plurality of tiers wherein a front end tier T1 may serve static content and cached dynamic content, another tier Ti may serve dynamic content processing (e.g. Electronic Program Guide grid/channels), content search, user management, etc. and a further tier TM may manage content data access. Furthermore, a computing farm 140—typically located at a cloud based computing facility—is provided and is able to allocate in real time more VMs (i.e. scale-out the infrastructure capacity by instantiating more VMs) or less VMs (i.e. scale-in the infrastructure capacity by removing some previously instantiated VMs) for the different applications distributed in the multi-tiered system 100. The computing farm 140, although referred as the M+1-th tier of the multi-tiered system 100, typically comprises physical machines 141 providing storage content support and is typically not scalable.

Applications providing similar services or part of a same service may be packaged into a same application class. An application class is typically a logical description of a deployment and describes the services provided by one or more applications. A physical realization of an application class represented as a group of VMs—launched, for example but not limited to, from a single Amazon Machine Image (AMI)—is a cluster. Application class and application cluster will be used interchangeably hereinafter in the present specification for sake of simplicity. FIG. 1 shows a plurality of application classes (AC(11), AC(12), ..., AC(M3), AC(M4), AC(M5)) that are distributed on one or more tiers (Ti, ..., TM) of the multi-tiered system 100. Each application class (AC(11), AC(12), ..., AC(M3), AC(M4), AC(M5)) includes one or more VMs instantiated to process the incoming client requests. Load balancers 150 are also provided for each tier (Ti, ..., TM) to ensure that the incoming load of client requests is evenly distributed over the VMs on a per application class basis.

In an embodiment of the present invention, an auto-scaler 110 is provided. The auto-scaler 110 comprises a workload monitor module 111 that monitors the incoming client requests (or incoming traffic) arriving at each tier and/or each application class (AC(11), AC(12), ..., AC(M3), AC(M4), AC(M5)), typically on a continuous basis. Additionally, the workload monitor module 111 gathers performance metrics such as for example, but not limited to, arrival requests rate, CPU utilization, disk access, network interface access or memory usage, etc. The auto-scaler 110 also comprises a controller module 112 (also referred to hereinafter as a real-time controller module), which receives the gathered performance metrics from the workload monitor module 111. The controller module 112 is able to determine an optimal number of VMs for each application class (AC(11), AC(12), ..., AC(M3), AC(M4), AC(M5)) of the multi-tiered system 100 that maximizes the net revenues according to metrics described in the Service Level Agreement (SLA) contract. In other words, the controller module 112 provides estimates of future service requests workloads using the performance metrics received from the workload monitor module 111 and performs dynamic and optimal VM allocation and provisioning for each application class (AC(11), AC(12), ..., AC(M3), AC(M4), AC(M5)) accordingly, typically on a continuous basis. The SLA contract typically specifies that the global response time be lower than a maximum acceptable level. Therefore, the auto-scaler 110 may ensure that the global response time is independent from the multi-tiered system load changes or at least remains within an acceptable performance degradation level. In such a situation, the controller module 112 of the auto-scaler 110 is able to dynamically adjust the number of VMs allocated for each application class (AC(11), AC(12), ..., AC(M3), AC(M4), AC(M5)) to simultaneously maintain the global response time quasi-constant and minimize the monetary cost of the VMs instantiated per application class.

Figure 2:
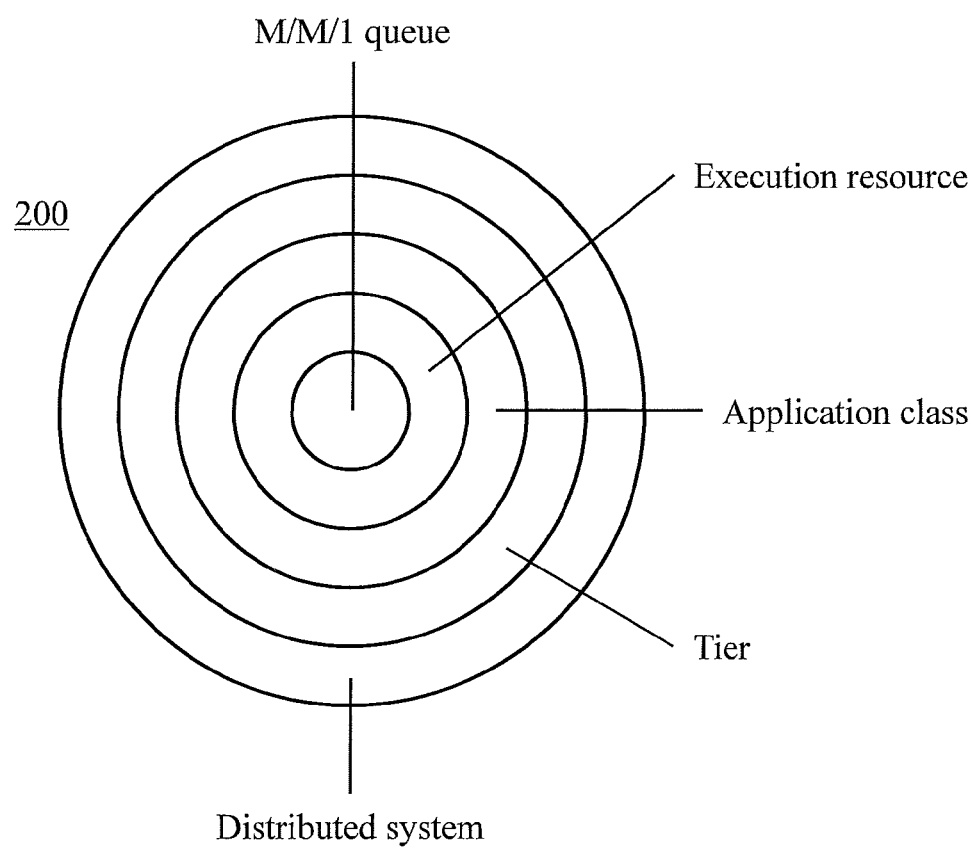
FIG. 2 is a descriptive illustration showing a distributed nested system representation in accordance with an embodiment of the present invention.

Reference is now made to FIG. 2, which is a descriptive illustration showing a distributed nested system representation in accordance with an embodiment of the present invention.

The multi-tiered system 100 of FIG. 1 can be modelled as a nested system 200 as shown in FIG. 2. The nested system 200 describes a high level modelling of the multi-tiered system 100 and may comprise:

Elementary execution resources (i.e. VMs) located at the inner level wherein each VM can be modelled as a queue and a processing unit (e.g. M/M/1 queue). A VM is able to receive and process incoming requests originating directly from a client or from a previous tier. In a case where the VM is not able to process the incoming requests, the VM feed-forwards them to the next tiers;

A plurality of $n_i(k)$ parallel VMs providing a single application class (denoted by AC(k)) that typically comprises the services requested for processing the incoming request arriving at a particular application class;

A tier typically comprises a plurality of application classes. Therefore, the i-th tier comprising a set of application classes can be modelled as a multiclass tier and be denoted by $T_i$; and The complete multi-tiered system comprises a plurality of multiclass tiers. Therefore, it can be modelled as a set of M multiclass tiers configured as an open network of queues with a tandem queue topology.

The nested system model 200 is also based on the following assumptions:

Each VM provides a single application class AC(k);

A plurality of VMs implementing a same application class typically run in parallel and belong to a same application class entity AC(k);

The incoming requests arriving at the i-th multiclass tier Ti forming the incoming workload $\lambda_i$ is divided equally among the VMs of a same application class AC(k);

The VMs of a same application class AC(k) running in parallel are homogeneous in terms of hardware capacity (Random Access Memory, CPU, etc.); and Each application class AC(k) within a multi-class tier Ti is an independent entity competing for the use of the infrastructural resources hosted and made available by the computing farm to customers over the network of queues.

In embodiments of the present invention, the dynamic scaling is performed on a per application class AC(k) basis. A single group of homogeneous VMs running the same software within an application class AC(k) is physically represented by a cluster. Multiple clusters may implement an application class AC(k) at one time. Therefore, a cluster aggregator (not shown) may be provided for identifying and registering all the machines to aggregate from clusters. For a given application, the cluster aggregator identifies all the clusters, and all instances for all clusters. The aggregated incoming workload is typically transmitted to the auto-scaler 110 which estimates the number of VMs on this basis.

Figure 3:
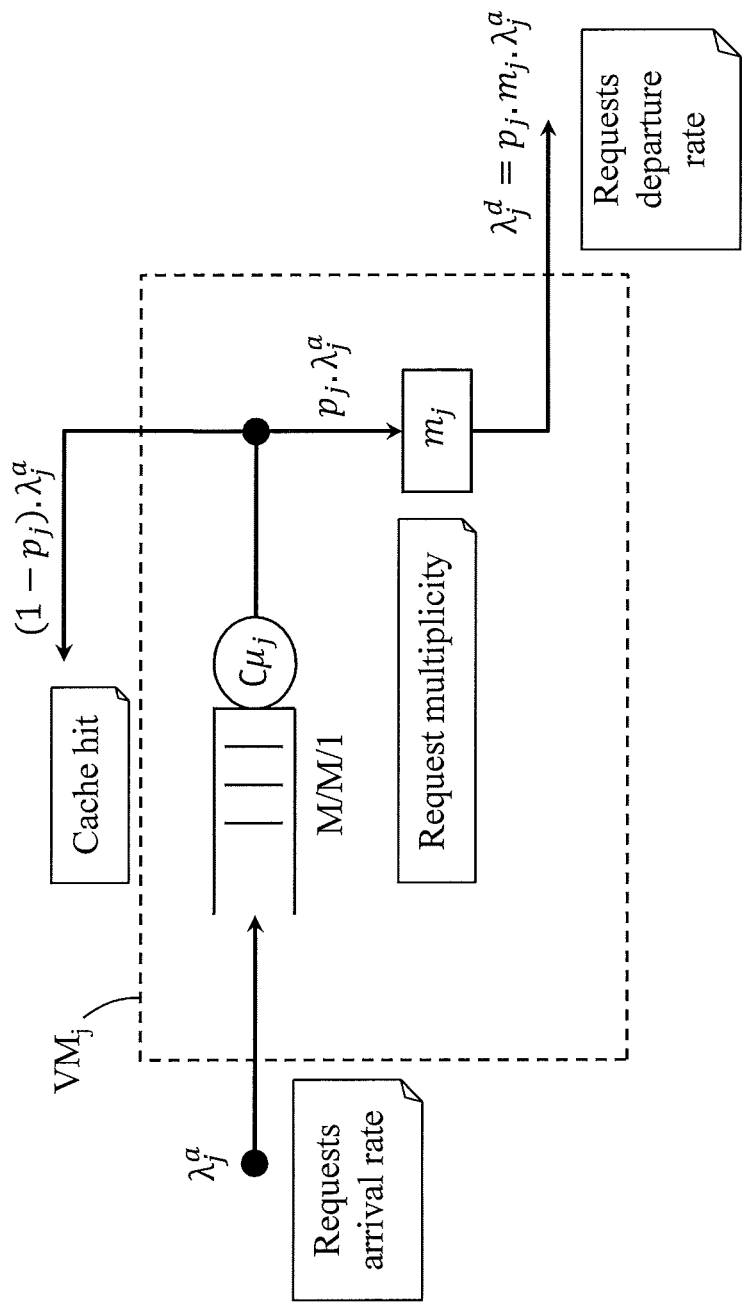
FIG. 3 is a simplified block diagram illustration of a virtual machine in accordance with a further embodiment of the present invention.

Reference is now made to FIG. 3, which is a simplified block diagram illustration of a virtual machine in accordance with a further embodiment of the present invention.

As explained hereinabove in relation to FIG. 2, a VM can be modelled as a queue and a processing unit able to receive and process incoming requests originating directly from a client 130 or from a previous tier. FIG. 3 gives a more detailed description of the generic VM model. The multi-tiered system workload may be represented as multiple system requests that, taking different virtual paths, consume different amounts of system resources. A request is a system-wide activity that is originated in response to an external demand for a particular application. For example, a Hypertext Transfer Protocol (HTPP) request may trigger the opening of a file locally and/or execution of multiple database queries on one or more remote tiers. In queuing theory, queuing systems can be described and classified according to the Kendall A/S/n convention, where A is the arrival process, S is the service process and n is the number of servers. Therefore, a single VM can typically be modelled as a M/M/1-PS queue representing the queue length in a system having a single server, where arrivals are determined by a Poisson process, service times have an exponential distribution and Processor Sharing (PS) scheduling discipline applies. In other words, the requests arriving and departing from a single VM occur randomly and are independent of one another. Furthermore, the PS scheduling discipline applies to account for the fact that the different VMs within an application class AC(k) are typically accessed in an evenly distributed way (e.g. round robin). In steady state operation, the average response time $R_j$ for the elementary $VM_j$ (the j-th VM within an application class AC(k) located on the multiclass tier $T_i$) does not depend on scheduling discipline and can be computed using Little's law as:

$$R_j = \frac{1}{\mu_j - \lambda_j^a}$$

where $\lambda_j^a$ is the mean Poisson arrival rate and the random service time is exponentially distributed with a mean value of $1/\mu_j$.

When a request arrives at the j-th VM, it can trigger zero, one or more subsequent requests that may be passed to the next tier.

The request arriving at VMj may not trigger any further request (i.e. zero requests) when the requested resource is found in the cache. The probability that the request leaves the multi-tiered system because of a cache hit is $(1-p_j)$. Therefore, the cache hit average rate of requests leaving the system is $(1-p_j)\cdot\lambda_j^a$.

The request arriving at VMj may trigger one or more subsequent requests that may be passed to the next tier when a cache miss is detected. In such a situation, with probability $p_j$, the request is passed to the next tier for processing. Also, a multiplicity factor denoted by $m_j$ is introduced to cover the cases where multiple subsequent requests are generated because of a cache miss, where $m_j$ is a strictly positive, time-dependent, discrete, random variable.

In this generic model, it is assumed that both the requests arrival rate and the cache hit rate have Poisson arrival distributions. However, this is not the case for the requests departure rate—being in turn the request arrival rate for the subsequent tier—because of the time dependency of the requests multiplicity factor $m_j$.

The request service rate $\mu_j$ depends on the average consumption of computing resources of a heterogeneous cluster of servers and also on the computational capacity requested by the application class AC(k). Namely, for the generic $VM_j$, these two dependencies can be computed as follows:

$$\mu_j(k) = \hat{\mu}_j \cdot C(k)$$

where $\hat{\mu}_j$ is a constant vector representing the average requests service rate that depends only on the physical characteristics of the VMs, and C(k) is a dimensionless parameter representing the computational capacity (CPU) of a VM normalized by a defined capacity unit specific to the application class AC(k).

Furthermore, the request cache hit rate is not taken into account in this model because the optimization is directed to the system workload, i.e. the requests that have not abandoned the system because of a cache hit. When a request leaves the system, it no longer contributes to the system workload and thus can be removed from the system. Therefore, the average departure rate $\lambda_j^d$ from $VM_j$ can be computed as follows:

$$\lambda_j^d = p_j \cdot m_j \cdot \lambda_j^a$$

Figure 4:
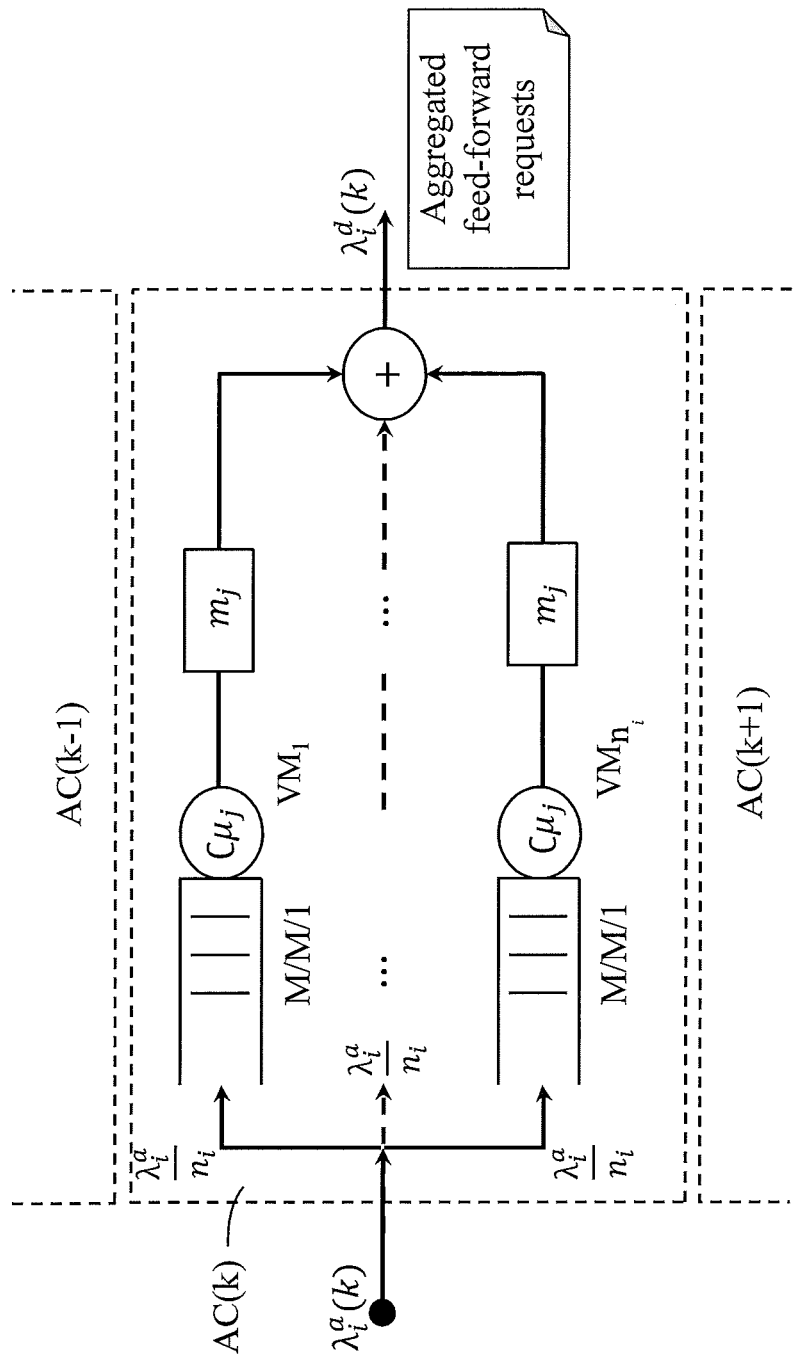
FIG. 4 is a simplified block diagram illustration of an application class within a specific tier in accordance with a further embodiment of the present invention.

Reference is now made to FIG. 4, which is a simplified block diagram illustration of an application class within a specific tier in accordance with a further embodiment of the present invention.

After having defined a model for the VM, it is also useful to model an application class comprising a plurality of VMs. FIG. 4 gives a more detailed description of the generic application class model. An application class AC(k) can be modelled as a set of $n_i(k)$ parallel VMs instantiated in response to the application requests workload. The requests arrival rate $\lambda_i^a(k)$ is equally distributed among the $n_i(k)$ VMs forming the corresponding application class AC(k) and can be computed as follows:

$$\lambda_j^a(k) = \frac{\lambda_i^a(k)}{n_i(k)}$$

Also, the requests departure rate of the VMs within a same application class AC(k) are typically aggregated to obtain the requests departure rate $\lambda_i^d(k)$ leaving an application class AC(k):

$$\lambda_i^d(k) = \sum_j \lambda_j^d(k)$$

It will be remembered that the average departure rate $\lambda_j^d(k)$ from the j-th execution resource $VM_j$ of the application class AC(k) is:

$$\lambda_j^d(k) = p_j \cdot m_j \cdot \lambda_j^a(k)$$

Therefore, the requests departure rate $\lambda_i^d(k)$ of a particular application class AC(k) is given by:

$$\lambda_i^d(k) = \gamma_i(k) \cdot \lambda_i^a(k)$$

with, $$\gamma_i(k) \approx \hat{p} \cdot E[m_j]$$

where $\hat{p}$ represents the cache miss probability $p_j$ for all VMs instantiated for the application class AC(k), and $E[m_j]$ is the average value of the multiplicity factors $m_j$.

Then, the average response time $R_i(k)$ for the application class AC(k) belonging to the i-th multiclass tier $T_i$ can be computed applying Little's law to the $n_i(k)$ parallel VMs shown in FIG. 4:

$$R_i(k) \cdot \lambda_i^a(k) = x_i(k)$$

where $x_i(k)$ represents the average number of items waiting for a service for application class AC(k) and is equal to the sum of all items waiting in the $n_i(k)$ queues. By introducing the system utilization $\rho_j(k)$—i.e. the average proportion of time during which the $n_i(k)$ VMs for the application class AC(k) are occupied—$x_i(k)$ is given by:

$$x_i(k) = \sum_{j=1}^{n_i(k)} \frac{\rho_j(k)}{1-\rho_j(k)} = \frac{\lambda_i^a(k)}{\hat{\mu}_J \cdot C(k) - \frac{\lambda_i^a(k)}{n_i(k)}}$$

Where the system utilization is given by:

$$\rho_j(k) \stackrel{def}{=} \frac{\lambda_j(k)}{\mu_j(k)}$$

in a stationary process.

Therefore, the average response time $R_i(k)$ for the application class AC(k) belonging to the i-th multiclass tier $T_i$ becomes:

$$R_i(k) = \frac{1}{\hat{\mu}_J \cdot C(k) - \frac{\lambda_i^a(k)}{n_i(k)}}$$

Figure 5:
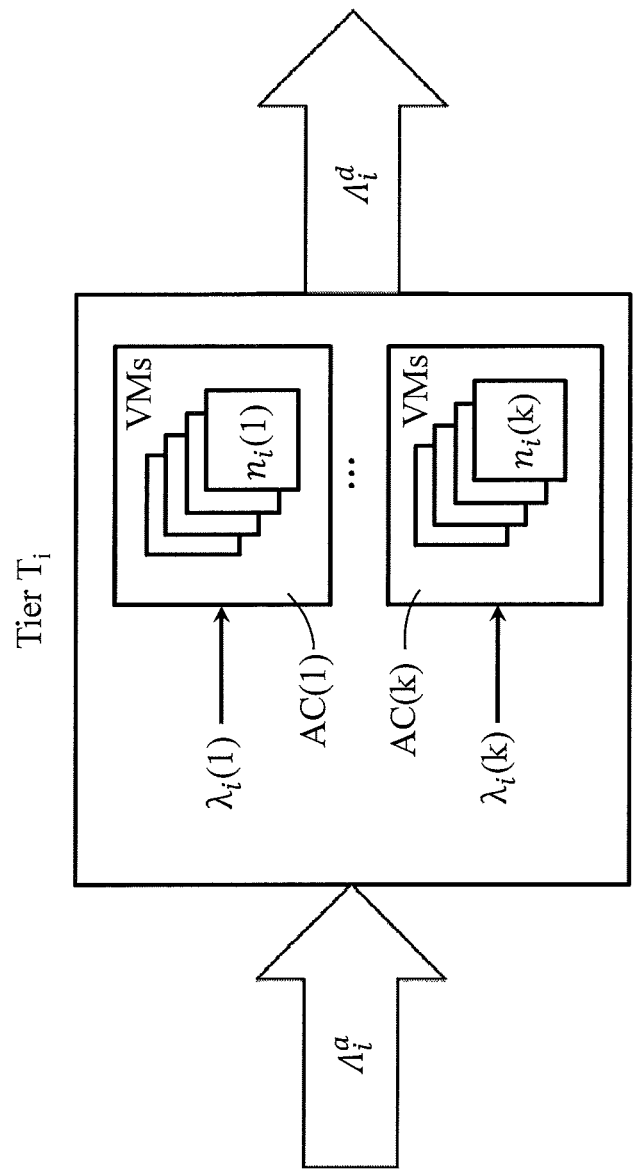
FIG. 5 is a simplified block diagram illustration of a multiclass tier in accordance with a further embodiment of the present invention.

Reference is now made to FIG. 5 which is a simplified block diagram illustration of a multiclass tier in accordance with a further embodiment of the present invention.

FIG. 5 shows a multiclass tier corresponding of the i-th multiclass tier $T_i$ of the multi-tiered system. The multiclass tier $T_i$ can be modelled as a nested entity hosting a plurality of different application classes AC(k), each of them instantiating an optimal number of VMs to satisfy the end-to-end multi-tiered system time response constraint as defined in the SLA.

The requests arrival rate $\Lambda_i^a$ (respectively the requests departure rate $\Lambda_i^d$) for the multiclass tier $T_i$ typically corresponds to the aggregated requests arrival rates (respectively the aggregated requests departure rates) of the different application classes AC(k) belonging to the multiclass tier $T_i$ and are therefore given by:

$$\Lambda_i^a = \sum_{k \in T_i} \lambda_i^a(k)$$

and, $$\Lambda_i^d = \sum_{k \in T_i} \lambda_i^d(k) = \sum_{k \in T_i} \gamma_i(k) \cdot \lambda_i^a(k)$$

In other words, $\Lambda_i^a$ is the offered traffic i.e. the rate at which requests are queued (arrived at the multiclass tier Ti), and $\Lambda_i^d$ is the throughput i.e. the rate at which requests are served (depart from the multiclass tier Ti).

Also, according to this model, the aggregated departure rate for the multiclass tier Ti is the aggregated arrival rate for the multiclass tier Ti+1 (in other words, the input workload for the multiclass tier $T_{i+1}$ is the aggregated throughput from the preceding multiclass tier $T_i$):

$$\Lambda_i^d = \Lambda_{i+1}^a$$

Figure 6:
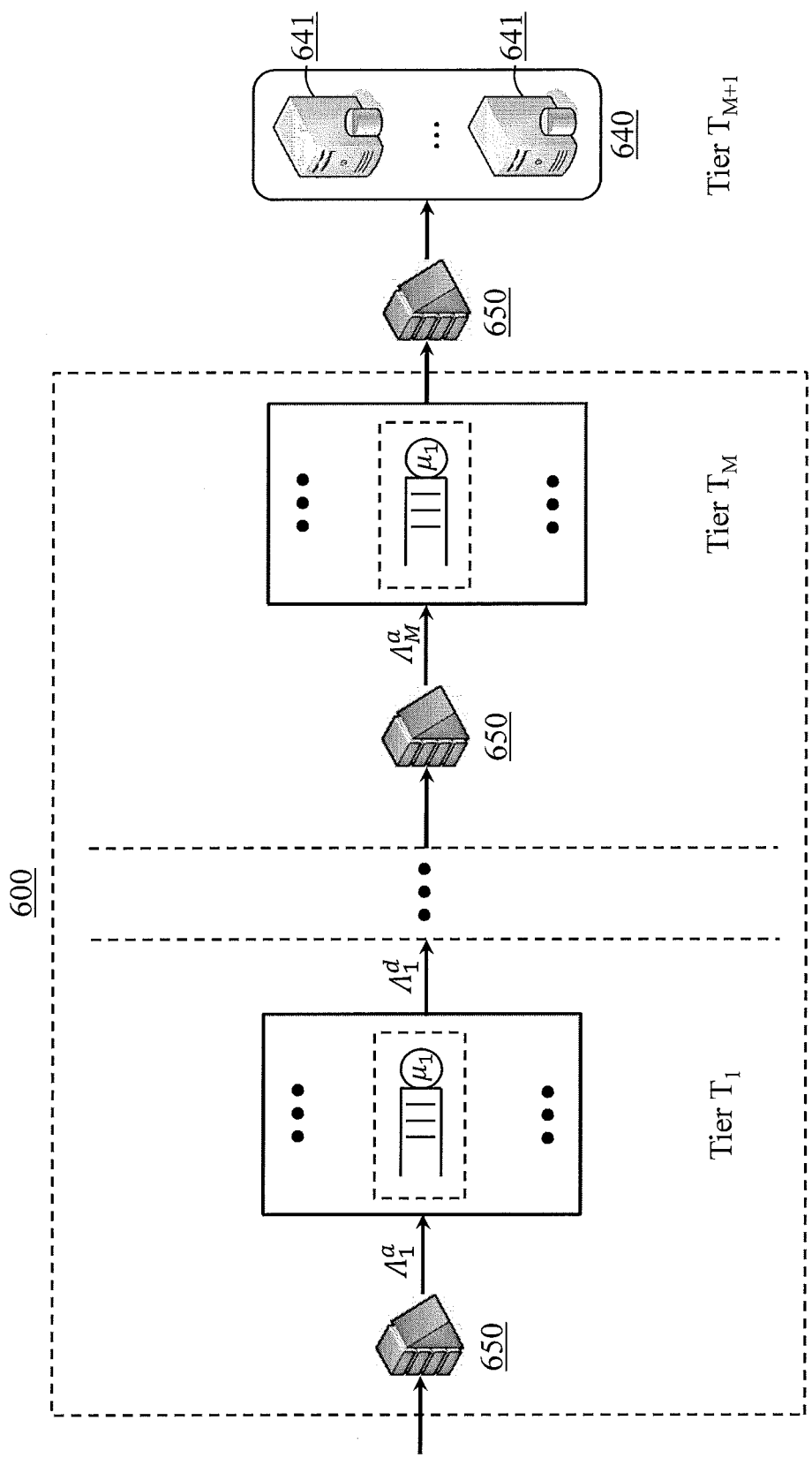
FIG. 6 is a simplified block diagram illustration of a multi-tiered system in accordance with a further embodiment of the present invention.

Reference is now made to FIG. 6 which is a simplified block diagram illustration of a multi-tiered system in accordance with a further embodiment of invention.

FIG. 6 shows a distributed system 600 modelling the system of FIG. 1 as a tandem queue network of M multiclass tiers coupled by load balancers 650. The load balancers 650 are provided to equally distribute, for each multiclass tier, the load on the available VMs for each application class AC(k). The dynamic scaling applies to the M multiclass tiers and not to the storage farm 640 (shown as the M+1-th tiers in FIG. 6). Indeed, it is recalled that the storage farm 640 typically comprises physical machines 641 providing storage content support and is therefore not scalable.

The arrival and departure rates are monitored on a per application class basis and the dynamic scaling is also performed on a per application class basis.

The average response time $E[R_i]$ for the multiclass tier Ti can be computed applying Little's law to the multiclass tier border. For sake of clarity and conciseness, it is assumed that the aggregated arrival rate can be written as $\Lambda_i$ instead of $\Lambda_i^a$ (i.e. dropping the superscript index (a)) and that the arrival rate for the application class AC(k) can be written as $\lambda_i(k)$ instead of $\lambda_i^a(k)$. Therefore, the average response time $E[R_i]$ for the multiclass tier $T_i$ is given by:

$$\hat{R}_i = E[R_i] = \frac{\sum_k R_i(k) \cdot \lambda_i(k)}{\Lambda_i} = \sum_{k \in T_i} w_i(k) \cdot R_i(k)$$

where $$w_i(k) = \frac{\lambda_i(k)}{\sum_k \lambda_i(k)} = \frac{\lambda_i(k)}{\Lambda_i} \; \forall k \in T_i$$

In a situation where the average response times for each multiclass tier $E[R_i]$ are independent and additive, the end-to-end average response time $E[R]$ is found aggregating the average response time for each multiclass tier across the multi-tiered system and is given by:

$$\hat{R} = E[R] = \sum_i E[R_i]$$

Those skilled in the art will appreciate that the following equation is verified and that the equivalence holds only in the case where one application class AC(k) belongs only to one tier (i.e. the tier coincides with the application class):

$$\sum_{i,k} R_i(k) \geq \sum_i E[R_i]$$

In embodiments of the present invention, the auto-scaling problem is described as an economic metaphor in which the service provisioning problem is a Nash game characterized by a collection of tiers providing application classes (the players) making local and selfish decisions in response to local observed network properties.

In game theory, a Nash equilibrium is a term used to describe equilibrium where each player's strategy is optimal given the strategies of all other players. Nash equilibrium exists when there is no unilateral profitable deviation from any of the players involved. Indeed, each application class can be seen as a competing "firm" positioned in a geographic region (a tier) producing a unique homogeneous product (the VMs) for a unique global market (the multi-tiered system). The market is therefore constituted of identical firms competing on a continuous time horizon. In this context, no individual player has the incentive to change its own production level if the other players do not change their production level as well. Finally, the challenge of such a multi-agent system is to derive a global acceptable behaviour (i.e. social welfare) through the design of individual agent control algorithms to reach a global equilibrium subjected to the maximum allowed global response time as specified in the SLA contract i.e. subjected to a stationary local net flow. Indeed, when the input loads increase, more requests are queued and the response time increase as well. However, the auto-scaler typically increases the number of VMs instantiated so that the local flow remains constant.

The economic metaphor for the auto-scaling game can be applied as follows:
  each application class (the firms) provides a number of services by running an application image on an homogeneous set of execution resources (the product);
  the application classes increase their benefits instantiating more execution units and reducing the cost of production. Those skilled in the art will appreciate that increasing the number of instances is a way to control the net flow rate. Each player (application class) typically decides on a number of execution resources needed by making selfish decisions based on the local offered load. However, the local offered load is controlled by the auto-scaler that takes care of the information gathered from the other tiers;
  the product price depends on the market demand and typically decreases as the number of products on the market increases. In other words, the rate of VMs typically decreases as long as the number of VMs increases while the rate of VMs typically increases as long as the number of VMs decreases; and
  an application class has no incentive to change the number of execution units instantiated if the other application classes do not change the number of execution units instantiated in order to reach the expected social welfare (i.e. to ensure that the global response time is close to or lower than the maximum value defined in the SLA).

The risk that an application class becomes a system bottleneck is implicitly mitigated. This is typically a consequence of the feed-forward model explained hereinabove in which the aggregated throughput from a tier is the offered load for the tier that follows in the chain.

Going further with the economic metaphor, a payoff function (in game theory, a payoff function is a mathematical function describing the award given to a single player at the outcome of a game) can be defined for the multi-tiered system model 600. The payoff function $\Phi_i(k)$ for an application class AC(k) belonging to the i-th tier $T_i$, expressed in arbitrary monetary unit, may be modelled as the difference between the gross product value and the cost of production, namely:

$$\Phi_i(k) = \text{Gross\_Product\_Value}(k) - \text{Cost\_of\_Product}(k)$$

The unitary gross product value, denoted by $P_i(k)$, is the gross revenue for a single execution resource. The costs function, denoted by $C_i(k)$, is the cost for producing the $n_i(k)$ execution resources instantiated to provide the services requested by the application class AC(k) at a unit cost $\beta_i(k)$. Therefore, the payoff function is given by:

$$\Phi_i(k) = P_i(k) \cdot n_i(k) - C_i(k) \forall k \in T_i$$

where $$C_i(k) = \beta(k) \cdot n_i(k) \forall i \in (1;M)$$

Also, it is common practice in distributed network systems to employ the Network Power Metric (NPM) because it is a scalable metric that typically captures key system performance indicators such as the requests arrival rate (offered traffic), the requests departure rate (throughput), local response times, global response time, etc., and identifies the operating points tradeoffs where the distributed system delivers the best performances. The NPM is defined as the ratio of the system throughput to the system average response time for the point of interest that can be, for example, the local application class AC(k) within the i-th multiclass tier $T_i$. Applied to the multi-tiered system model 600, the NPM is defined by:

$$NPM_i(k) \stackrel{def}{=} \frac{\text{System throughput } [\lambda_i^d(k)]}{\text{Response time } [R_i(k)]}$$

Those skilled in the art will appreciate that the average system throughput and the average system response time are measured at homogeneous points to represent consistent network power estimations. In particular, the ratio of the aggregated throughput from a tier to the average response time of the same tiers may be used as a suitable solution to capture correctly the network power of the tier. The NPM is directly proportional to the system throughput for fixed response time and inversely proportional to the response time for fixed throughput. Therefore:

the network power increases when the throughput increases (meaning that there are fewer requests waiting in the queue) and/or the response time decreases;

the network power decreases when the response time increases (meaning that the system tends to saturate) and/or the throughput decreases; and for a M/M/1 queue, the NPM has a maximum value when the system capacity is $$\rho = \frac{1}{2}$$

and when there is exactly one entity waiting to be served (Kleinrock condition).

In a typical scenario where the requests arrival rate increases, the requests departure rate increases as long as there is a limited number of cache hits. However, the response time typically increases since the number of requests waiting to be served in the queue increases thereby leading to a situation where the system may eventually saturate and any further incoming requests are lost. This results in a system bottleneck. System bottlenecks can generally be avoided by reducing the service time either by increasing the CPU rate (system speed-up) thereby increasing the number of requests served per time unit or by adding more execution resources in parallel (system scale-out) thereby reducing the number of requests entering the VMs. Embodiments of the present invention relate to system scale-out and not system speed-up. Indeed, when the input requests per second increases, the multi-tiered system 600 typically reacts by increasing the number of VMs under control of the controller module. However, the multi-tiered system capacity, in terms of CPU rate, still remains the same. In the description that follows, and without loss of generality, it is assumed that the service rate for all the execution resources is equal to 1 or, in other words, that the generic VM can process one request per time unit. Indeed, the input workload will typically always be normalized to the actual service rate that captures the dependency on the application class and on the physical cluster for which the execution resources are provided. Those skilled in the art will appreciate that the unitary gross product value (market price) $P_i(k)$ is modelled as the network power per execution resource:

$$P_i(k) = \frac{1}{n_i(k)} \cdot NPM_i(k)$$

The production model described in the latter equation assumes that each player (application class) is engaged in an economic game at a chosen level of production $n_i(k)$. Indeed, the production of one application class (the local response time) also depends on the global response time induced by the other application classes participating in the game. However, increasing the number of execution units in order to reduce the input load of each execution resources typically increases the cost and reduces the unitary gross product value (inverse market demand).

Finally, three different situations may appear depending on the throughput and the offered traffic at a specific tier:

1. $\Lambda_i^a(k)/\Lambda_i^d(k) > 1$. In this situation, the number of requests arriving at the application class AC(k) is greater than the requests leaving. The multi-tiered system 600 under control of the auto-scaler may scale-out to satisfy the increasing demand and, at the same time, reduce the local response time adding more VMs. However, the requests may merely be served in the cache (cache hit) without a need for scaling-up. The local network power typically increases but the global network power does not increase because the requests leaving the application classes decrease;

2. $\Lambda_i^a(k)/\Lambda_i^d(k) = 1$. In this situation, there is neither cache hit nor multiple requests being generated and forwarded to the other tiers. Therefore, the incoming requests flow is conserved and remains stable. The existing number of instantiated VMs is typically sufficient to serve all the incoming requests. The local network power and global network power does not change; and 3. $\Lambda_i^a(k)/\Lambda_i^d(k)<1$. In such a situation, the number of requests leaving the application class AC(k) is greater than the requests arriving. The multi-tiered system 600 under control of the auto-scaler may scale-in to satisfy the diminishing demand. This case typically originates a decrease of the local network power because fewer input requests have to be served. However, the increased number of aggregated requests leaving the tier becomes the arrival requests for the i+1-th tier $T_{i+1}$ that may then be provisioned with additional VMs to satisfy the demand.

According to the description given hereinabove, the payoff function for an application class AC(k) belonging to the i-th tier $T_i$ is given by:

$$\Phi_i(k) = NPM_i(k) - \beta_i(k) \cdot n_i(k)$$

$$\forall k \in T_i, \forall i: i=1, M$$

thereby leading to, $$\Phi_i(k) = \frac{\lambda_i^d(k)}{R_i(k)} - \beta_i(k) \cdot n_i(k)$$

The scaling game for the multi-tiered system 600 may then be described as the simultaneous solution of the control problems described by the latter equation that gives the optimal number of VMs to be instantiated for a particular application AC(k) belonging to the i-th tier $T_i$. The solutions are subjected to the following coupled constraints:

$\hat{R} = \Sigma_i E[R_i] < R_{max}$ $\forall i: i=1, M$. This condition typically means that the end-to-end response time is always lower than a maximum level Rmax defined in the SLA contract. Those skilled in the art will appreciate that this constraint may be replaced by a more stringent one such as the one described earlier in the present specification or $\hat{R} = \Sigma_i E[R_i] \leq \Sigma_{i,k} R_i(k) \leq R_{max}$;

$$\hat{\mu}_j \cdot C(k) - \frac{\lambda_i(k)}{n_i(k)} > 0 \ \forall k \in T_i,$$

$\forall i: i=1, M$. This is the queue stability condition that is to be met to avoid the situation where an execution resource belonging to the application class AC(k) saturates thereby becoming a system bottleneck;

$n_i(k) < N_i^{max}(k)$ $\forall k \in T_i$. This condition specifies that the maximum pool size of VMs depends also on the affordable budget. This constraint is optional but may apply in another embodiment of the present invention. Typically, if there is a need to increase the number of VMs to a number greater than or equal to $N_i^{max}(k)$, then any further request arriving is merely rejected and lost; and $n_i(k) > N_i^{min}(k)$ $\forall i: 1, \ldots, M$. This condition specifies that the number of VMs instantiated per application class is greater than a minimum pool size and ensures that at least a $N_i^{min}(k)$ VMs are always instantiated at all times. The minimum number of execution resources is therefore always greater than a minimum configuration value that may be either set by default or by the operator for scheduling purposes. Again, this constraint is optional but may apply in a further embodiment of the present invention.

The dynamic scaling problem defined hereinabove as a particular Nash game is symmetric because all application classes participating in the game have the same model, and play the same game with the same rules on the same market. The goal of the controller module is to optimize the payoff function for each application class AC(k) adapting the number of execution resources over the time to the input requests rate for reaching a social welfare where the global response time is below a maximum agreed level (SLA). For sake of simplicity, but without limiting the generality of the invention, the calculations hereinbelow apply to a single generic application class AC(k) where the explicit dependency on the tier (i.e. the subscript i) has been removed. The results found for the generic application class AC(k) will then be extended to the multiclass/multi-tiered system.

First, it is preferable to rewrite the payoff function to show explicitly the dependency on time:

$$\Phi_i(k; t) = \frac{\lambda_i^d(k; t)}{R_i(k; t)} - \beta_i(k; t) \cdot n_i(k; t)$$

Also, the dependency on the i-th tier is now removed:

$$\Phi_k(t) = \frac{\lambda_k^d(t)}{R_k(t)} - \beta_k(t) \cdot n_k(t)$$

Figure 7:
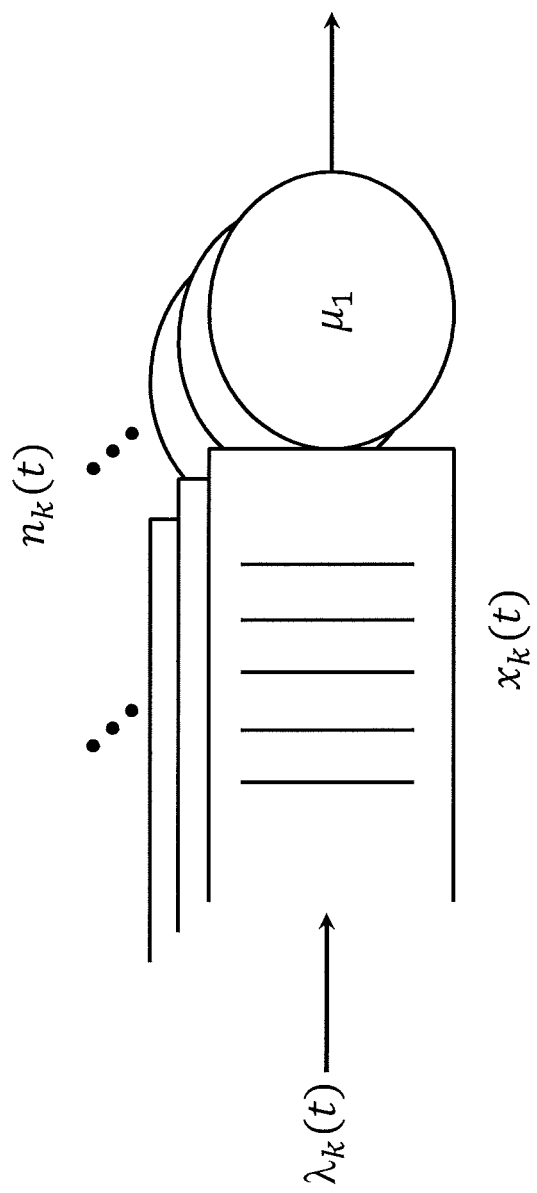
FIG. 7 is a simplified block diagram illustration of a simplified model for an application class in accordance with a further embodiment of the present invention.

Reference is now made to FIG. 7 which is a simplified block diagram illustration of a simplified model for an application class in accordance with a further embodiment of invention.

FIG. 7 describes an application class AC(k) modelled as a network of M/M/1 queues in parallel wherein:

$x_k(t)$ is the state variable representing the total number of items waiting in the queues at time t for all the VMs instantiated for the application class AC(k);

$\mu_k$ is the actual request service rate for application class AC(k);

$\lambda_k^d(t)$ is the rate at which requests are served (throughput); and $n_k(t)$ is the control variable representing the total number of VMs at time t for the application class AC(k).

The local response time $R_k(t)$ per application class AC(k) can therefore be computed using Little's law:

$$R_k(t) \cdot \lambda_k^a(t) = x_k(t)$$

Initially, the control variable $n_k(t)$ depends only on the time. In other words, the strategy adopted by each player (application class) is described as an open-loop strategy. An open-loop strategy is a strategy which computes its input into a system using only the current state and its model of the system. For a network of $n_k(t)$ M/M/1 queues in parallel (VMs)—using the flow conservation principle and assuming that there are no losses—the rate of change of the average number of entities queued per application class AC(k) is computed as the difference between the input flow (i.e. the offered requests rate) and the output flow (i.e. the average number of entities waiting in the queue at steady state). The state variable $x_k(t)$ shown in FIG. 7 typically evolves in time as follows:

$\dot{x}_k(t)$=Offered_Flow($t$)−Output_Flow($t$)

or, $$\dot{x}_k(t) = \lambda_k^a(t) - \tilde{\mu}_k \cdot \frac{x_k(t)}{1 + \frac{x_k(t)}{n_k(t)}}$$

The goal of the k-th player (application class AC(k)) is to maximize its own payoff function $\Phi_k(t)$ to reach the global welfare, i.e. an acceptable global response time lower than the maximum value $R_{max}$ defined in the SLA. The optimal number of execution units (VMs) can be computed using the Pontryagin's Maximum Principle (PMP). Pontryagin's maximum principle is used in optimal control theory to find the best possible control for taking a dynamic system from one state to another, especially in the presence of constraints for the state or input controls. The corresponding Hamiltonian $H_k$ for the single node AC(k) optimal control is defined as follows:

$$H_k(x_k, n_k, \xi_k; t) = \Phi_k(t) + \xi_k(t) \cdot \left( \lambda_k^a(t) - \tilde{\mu}_k \cdot \frac{x_k(t)}{1 + \frac{x_k(t)}{n_k(t)}} \right)$$

and shall satisfy the following relation for the optimal values (denoted by an asterisk) of the control variable $n^*_k$ and for the state variable $x^*_k$ $$H_k(x^*_k, n^*_k; t) \geq H_k(x^*_k, n_k; t)$$

i.e. the payoff function is maximised by $n^*_k$ for all the possible values of the control variable $n_k$. The variable $\xi_k(t)$ is the co-state variable and $\tilde{\mu}_k$ is the service rate per application class that depends on the application class AC(k) and on the cluster capacity This condition is equivalent to saying that the offered request rate is normalized to the actual service rate and may be therefore written as follows:

$$\rho_k^a(t) \stackrel{def}{=} \frac{\lambda_k^a(t)}{\tilde{\mu}_k}$$

The same argument can be used for the departure rate that may be normalized to the actual service rate and therefore written as follows:

$$\rho_k^d(t) \stackrel{def}{=} \frac{\lambda_k^d(t)}{\tilde{\mu}_k}$$

And finally, we shall define an equivalent normalized load as follows:

$$\rho_k^2(t) \stackrel{def}{=} \rho_k^a(t) \cdot \rho_k^d(t)$$

The equivalent normalized load $\rho_k$ takes into account the cache miss probability $\hat{p}$ and the average request multiplicity factor $E[m_j]$ already defined in another embodiment of the present invention. In particular, the following relation holds:

$$0 \leq \rho_k \leq \sqrt{\gamma_k} \cdot \rho_k^a(t)$$

$$\gamma_k \stackrel{\cdot}{=} \hat{p} \cdot E[m_j]$$

Assuming, $$\beta_k(t) = (\tilde{u}_k \cdot w_k)^2 = \text{constant}$$

then, the payoff function $\Phi_k(t)$ is given by:

$$\Phi_k(t) = \frac{\rho_k^2(t)}{x_k(t)} - w_k^2 \cdot n_k(t)$$

Furthermore, using the PMP technique to find the necessary condition for optimality, from the equation defining the Hamiltonian, it is possible to derive the stationary condition for the control variable:

$$\frac{\partial H_k}{\partial n_k} = 0 = -w_k^2 - \xi_k \cdot \left( \frac{x_k}{n_k + x_k} \right)^2$$

and, the optimal co-state trajectory:

$$\frac{\partial H_k}{\partial x_k} = -\dot{\xi}_k = -\left( \frac{\rho_k}{x_k} \right)^2 - \xi_k \cdot \left( \frac{n_k}{n_k + x_k} \right)^2$$

Those skilled in the art will appreciate that these last two equations coupled to the one defining the state trajectory $\dot{x}_k(t)$ typically solve the single node generic application class AC(k) optimization problem.

Also, it is common practice to consider the special case when the co-state trajectory is stationary i.e. $\dot{\xi}_k=0$. In such a case, the latest two equations can be solved with algebraic methods that are readily applicable to the real-time implementation of an optimal controller. In particular, the following two conditions at equilibrium point are found:

$$\frac{\rho_k(t)}{n_k^*(t)} = w_k$$

This condition typically corresponds to the M/M/1 queue stability condition constrain that is always satisfied because $w_k < 1$.

$$\frac{\rho_k(t)}{x_k^*(t)} = 1 - w_k$$

This condition typically corresponds to the end-to-end response time $R_k(t)$ that shall be always lower than a maximum level $R_{max}$ as defined in the SLA contract. Indeed, by direct substitution of the parameters definition we have:

$$\frac{\rho_k(t)}{x_k^*(t)} = \frac{\alpha_k}{R_k(t)} = 1 - w_k \geq \frac{\alpha_k}{R_{max}}$$

-continued where $\alpha_k \stackrel{def}{=} \frac{\sqrt{\gamma_k}}{\tilde{\mu}_k}$ Therefore, the value of the unitary cost $w_k$ shall satisfy the following relation:

$$0 < w_k \leq 1 - \frac{\alpha_k}{R_{max}}$$

Furthermore, the optimal condition that holds between the state variable $x^*_k(t)$ and the control variable $n^*_k(t)$ is given by:

$$n_k^*(t) = \left(\frac{1}{w_k} - 1\right) \cdot x_k^*(t)$$

This equation typically defines a feedback proportional controller since the control variable $n_k(t)$ is proportional to the state variable $x_k(t)$. Under this condition of optimality, the state variable trajectory is specified by the following optimal equilibrium:

$$\dot{x}_k(t) = \rho_k(t) - (1 - w_k) \cdot x_k(t)$$

while the control state trajectory is specified by:

$$\dot{n}_k(t) = \left(\frac{1}{w_k} - 1\right) \cdot \rho_k(t) - (1 - w_k) \cdot n_k(t)$$

It will be appreciated by those skilled in the art that the last equation corresponds to a low pass filter assuming that $\rho_k(t)$ is the input signal and $n_k(t)$ is the output signal of a linear and memory less system. The Laplace transform $\mathcal{L}\{.\}$, with complex parameter p, applied to the last equation is as follows:

$$\frac{\mathcal{L}\{n_k(t)\}}{\mathcal{L}\{\rho_k(t)\}} = \frac{\frac{1}{w_k} - 1}{(1 - w_k) + p}$$

Then, by applying the bilinear transform to the Laplace transform, the corresponding equivalent Z-transform transfer function H[z] is found to be:

$$H[z] = \frac{b + b \cdot z^{-1}}{1 + c \cdot z^{-1}}$$

Where b and c are constant parameters that depend only on the configuration parameter $w_k$.

Anti-transforming the previous equation, the real-time controller (i.e. the controller module of the auto-scaler) in the discrete domain for the single node application class AC(k) optimization problem may be implemented as follows:

$$u1[n] = -c \cdot u1[n-1] + b \cdot u[n] + b \cdot u[n-1]$$

where $u1[n]$ is the output discrete signal for the n-th sample, i.e. the discrete mapping of the continuous signal $n_k(t)$; $u[n]$ is the input discrete signal for the n-th sample, i.e. the discrete mapping of the continuous signal $\rho_k(t)$; and b and c are constant parameters that depend only on the configuration parameter $w_k$.

Going further in this electrical analogy and assuming that the input signal is $\rho_k(t)$ and the output signal $n_k(t)$ is the voltage across the RC cell (Resistor-Capacitor cell), it is found that the RC time constant is also the local response time:

$$R_{eq}C_{eq} = R_k(t) = \frac{1}{1 - w_k}$$

Therefore, the cutoff frequency $f_c$ for such a low pass filter is given by:

$$f_c = \frac{1}{2\pi R_{eq} C_{eq}}$$

Also, in the electrical circuit analogy described hereinabove, it is to be assumed that the input load (input requests load) has low variations compared with the low pass filter rise time $t_{rise}$:

$$t_{rise} = 2.197 \cdot R_{eq} C_{eq} = \frac{2.197}{1 - w_k}$$

Applying this electrical analogy to the overall multi-tiered system leads to a model in which the global multi-tiered system may therefore be seen as a circuit of equivalent RC cells each of them contributing to the global delay and the global response time.

Figure 8:
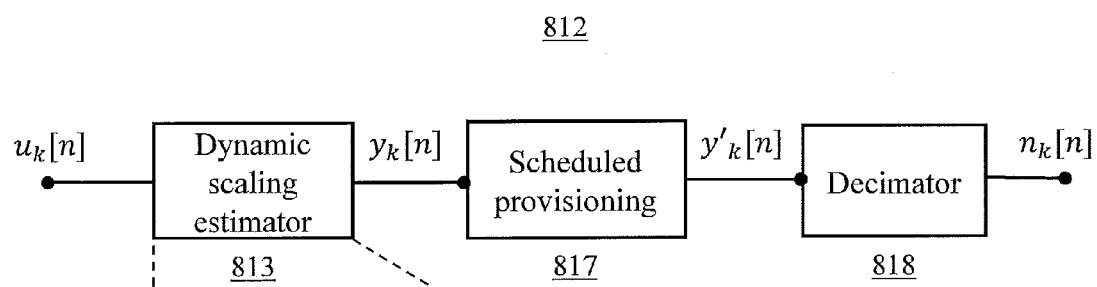
FIG. 8 is a simplified block diagram illustration of a real-time controller module in accordance with a further embodiment of the present invention.
Figure 9:
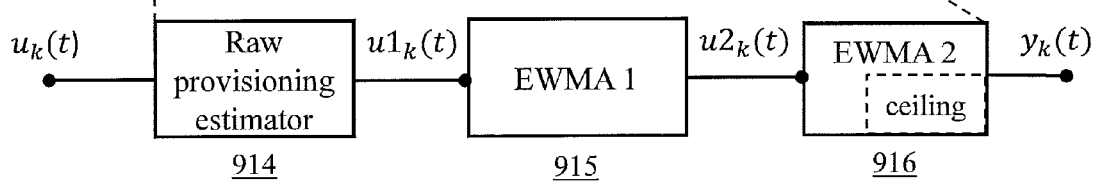
FIG. 9 is a simplified block diagram illustration of a dynamic scaling estimator sub-module part of a real-time controller module in accordance with a further embodiment of the present invention.

Reference is now made to FIG. 8 and FIG. 9, which are a simplified block diagram illustration of a real-time controller module and a simplified block diagram illustration of a dynamic scaling estimator sub-module part of a real-time controller module respectively in accordance with further embodiments of the present invention.

In an embodiment of the present invention, the strategy adopted by each application class AC(k) part of the multi-tiered system is an open-loop strategy. An open-loop strategy is a strategy which computes its input into a system using only the current state and its model of the system. In this strategy, the control variable $n_k(t)$ depends only on the time and not on state parameters (such as CPU, I/O, memory usage, etc.). The open-loop strategy described hereinabove for a single node generic application class AC(k) is typically extended to the other application classes participating to the provisioning game in such a way that the net flow in each queue for any new VM instantiated does not overflow even in situations where the offered load changes. The offered request rate is sampled every $1/F_s$ second to provide a sample u[n] used by the real-time controller 812 to estimate the optimal number of execution resources y[n] required. The optimal controller configuration ensures that the optimal stationary condition is reached for all players (the application classes) participating in the game before acquiring a new sample and the global response time is kept below the maximum acceptable value $R_{max}$ specified in the SLA. In particular, for a multiclass system the total delay can be estimated as the sum of the response time of the application classes participating in the game by direct application of Little's law, as follows:

$$\frac{x_1}{\lambda_1^a} + \frac{x_2}{\lambda_2^a} + \ldots + \frac{x_k}{\lambda_k^a} \leq R_{max}$$

where $x_1, x_2, \ldots, x_k$ are the state variables for the k application classes representing the number of items waiting in the queue. Extending to the multiclass system the same argument already used in the case of single application class AC(k), the maximum acceptable response time will be partitioned as follows:

$$\frac{x_1}{\lambda_1^a} + \frac{\alpha_1}{1-w_1} \leq \pi_1 \cdot R_{max}$$

$$\ldots$$

$$\frac{x_k}{\lambda_k^a} = \frac{\alpha_k}{1-w_k} \leq \pi_k \cdot R_{max}$$

$$\pi_1 + \ldots + \pi_k = 1$$

Where $\pi_k = \frac{1}{K}$ and $\alpha_k \stackrel{def}{=} \frac{\sqrt{\gamma_k}}{\tilde{\mu}_k}$ A system operator typically specifies the configuration parameter $w_k$ depending on two empirical parameters $\alpha_k$ and $\pi_k$.

Having a single control point enables the real-time controller 812 to adapt the offered request rate depending on the service rate so that the scaling rate is controlled by a suitable selection of the parameters $\alpha_k$ and $\pi_k$. The parameter $\alpha_k$ may be roughly estimated using $\tilde{\mu}_k$ i.e. the service rate per application class. However, depending on the offered traffic history at the input of each tier, it may become possible to make the multi-tiered system adaptable to an increase of the incoming traffic arriving at a specific tier. The parameter $\pi_k$ provides a simple configuration method to partition the requested global response time among the application classes. Different methods may be applied to achieve this result. One of them may be to assign an equal contribution to the application classes and in this case $\pi_k = 1/K$ where K is the total number of application classes. On the other side, an operator may decide to assign an uneven partition per application class. In the more general case of multiclass and multi-tiered system where a tier can provide more application classes, the offered load per application class will be substituted by the aggregated offered load $\Lambda_k^a$ but the argument remains the same. In brief, the strategy is to apply an auto-scaling rule per single application class by specifying the parameter $w_k$ (that in turns depends on $\alpha_k$ and $\pi_k$) dynamically adapting the provisioning rate estimated by the auto-scaling logic to the actual aggregated offered load.

Furthermore, in the particular case where each tier includes a single application class AC(k), then the global response time is the sum of the local response times. In the more realistic case where each tier includes a plurality of application classes, then the response time of the individual application class AC(k) is proportional to the number of requests waiting in the queue and changes dynamically as the offered load increases/decreases. However, the global response time, being computed as the weighted mean of the response times of each application class included in a tier, is lower than the sum of the local response times taken into account for the optimization. The SLA contract typically requires that the average global response time across multiple tiers is lower than a maximum allowed value. If this limit is to be applied to the sum of the local response times across multiple application classes, the result is that the real-time controller instantiates more execution units than required. This limitation may be useful since it anticipates the greater number of execution units required when unpredictable bursts load arrive at the cost of a minimal over-provisioning controllable via the configuration parameter $w_k$ computed via the two parameters $\alpha_k$ and $\pi_k$.

Figure 10:
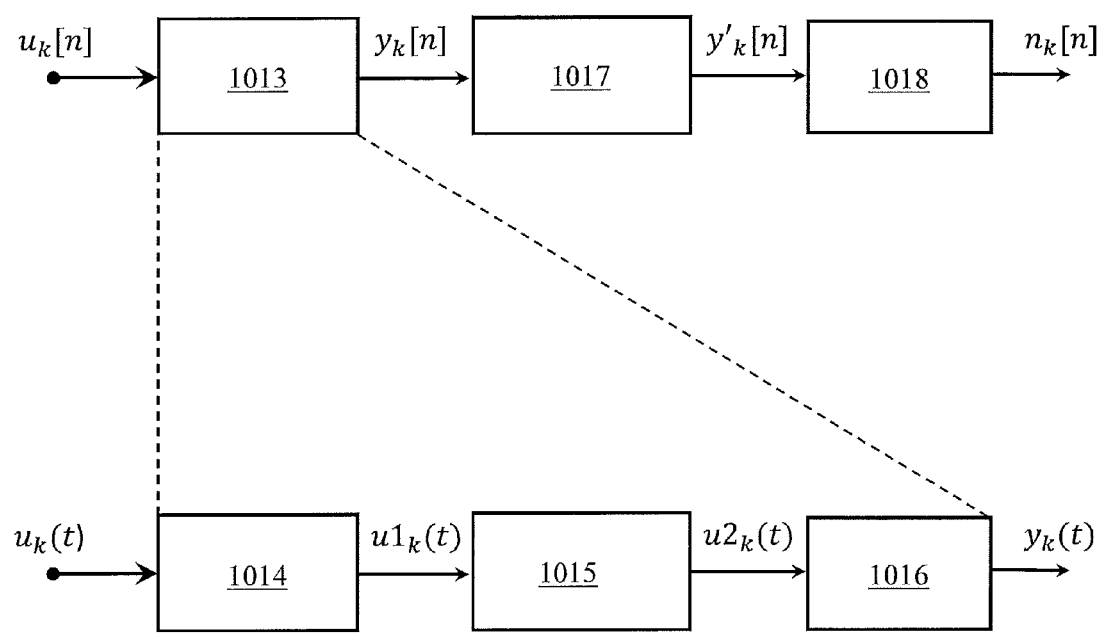
FIG. 10 is a flow chart diagram describing a method of operating a real-time controller module in accordance with a further embodiment of the present invention.

In this embodiment, the strategy adopted by each application class AC(k) part of the multi-tiered system is an open-loop strategy. The real-time controller module 812 is configured accordingly and therefore seeks to optimize a local payoff function to reach a global welfare (or optimal equilibrium condition) and minimize a provisioning cost on per application class AC(k) basis over the time, typically on a continuous basis. Those skilled in the art will appreciate that although the dynamic scaling is described as performed on a continuous time basis, this dynamic scaling may be also performed in a similar manner but at regular/pre-defined time intervals. The global welfare—i.e. approximate constant global response time—is reached performing execution resources (VMs) allocation and provisioning for each application class AC(k) under control of the real-time controller module 812 on the basis of a set of observable parameters (incoming client requests or incoming traffic arriving at each tier and/or each application class) received from the workload monitor module. To do so, the real-time controller module 812 is provided with sub-modules including a dynamic scaling estimator sub-module 813, a scheduled provisioning sub-module 817 and a decimator sub-module 818 as shown in FIG. 8. The sub-modules functioning will be also described in relation to FIG. 10, which is a flow chart diagram describing a method of operating a real-time controller module in accordance with a further embodiment of the present invention. At a high-level, the real-time controller 812 can be seen as an exponential moving average estimator that gives an estimate of the number of resources available depending on the system or traffic intensity ($\rho$) on a per application class AC(k) basis. Then, the number of execution resources (VMs) of each application class AC(k) is adjusted according to the variations of the offered load with a minimal over-provisioning to account for unpredictable input burst loads. The real-time controller 812 ensures that the critical condition is never reached by provisioning more execution units and that the optimal condition is always satisfied for the aggregated offered workload ($\lambda$) as long as $w_k<1$.

Figure 11:
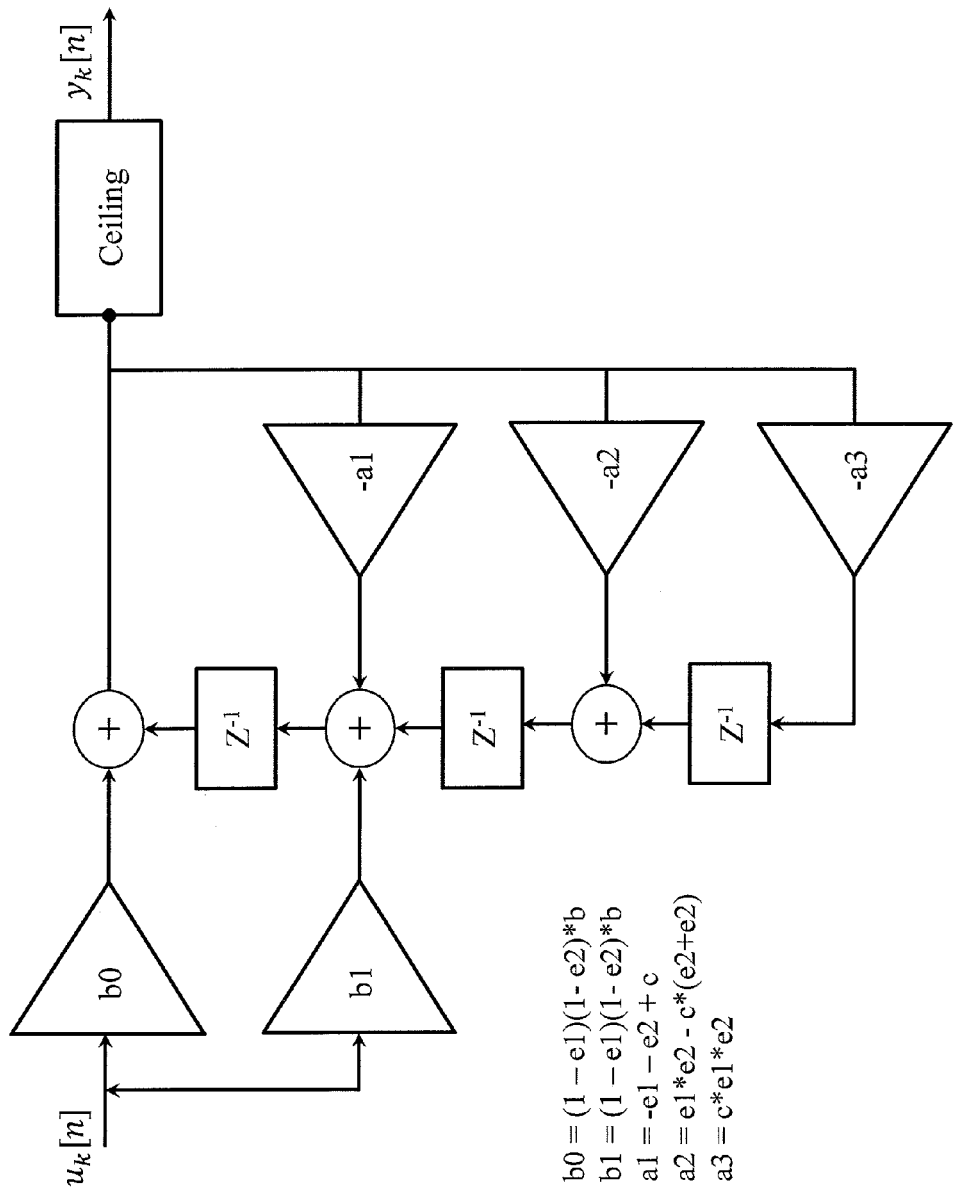
FIG. 11 is a simplified block diagram illustration of a dynamic scaling estimator sub-module part of a real-time controller implemented as a digital filter in its transposed direct form II in accordance with a further embodiment of the present invention.

The dynamic scaling estimator sub-module 813 can be modeled as an Infinite-Impulse-Response (IRR) low pass filter typically including a raw provisioning estimator sub-component 914 as well as first and second moving average sub-components 915-916. The dynamic scaling estimator sub-module 813 typically provides, for each application class AC(k), an estimation of the number of VMs that are to be instantiated depending on the normalized input load and may be implemented as a digital filter in its transposed direct form II as indicated in FIG. 11 (step 1013 of FIG. 10).

For sake of clarity, the definition of the normalized offered load is rewritten below:

$$\rho_k(t) \stackrel{def}{=} \frac{\lambda_k(t)}{\tilde{\mu}_k}$$

where, $\lambda_k$ is the incoming aggregated requests for a particular application class AC(k); and $\tilde{\mu}_k$ is the service rate for an application class AC(k) and is provided as a configuration parameter denoted by max_nb_requests_per_sec. In practice, this parameter can be estimated by monitoring the application resident times by offline experiments to measure the average service rate or by rule-of-thumb assumptions observing the time spent by an application on a tier and on the subsequent tier that processed the request. Also, this parameter is typically lower than the critical service rate to prevent under-provisioning when unpredicted incoming bursts appear. The lower the value of the max_nb_requests_per_sec parameter compared to the critical service rate is, the higher is the provisioning rate at the cost of minimal over-provisioning. This parameter depends on the pair (Application class id, Cluster id) assuming that the cluster referenced is actually the physical cluster. In particular, the max_nb_requests_per_sec parameter depends on the average consumption of computing resources (i.e. physical characteristics of the cluster on which the application class is implemented) and on the computational capacity requested by the application class. This parameter is typically set between 50 to 80% of the critical service rate. However, other strategies are possible like subtracting a fixed constant value to the critical service rate.

Also, the raw estimation u1[n] of the number of VMs required per application class is output from the raw provisioning estimator sub-component 914 (step 1014) and is done with the following filter:

$$u1[n]=-c \cdot u1[n-1]+b \cdot u[n]+b \cdot u[n-1]$$

where, u[n] is the n-th sample of the input time series representing the normalized equivalent load $\rho_k(t)$; b and c are coefficients depending on the filter configuration and the sampling frequency $F_s$; and n is the n-th sample of the time series considered. Also, we have:

$$a = \frac{1}{\tan\left(\frac{1-w_k}{2F_s}\right)}$$

$$b = \frac{1}{w_k} \cdot \frac{1}{1+a}$$

$$c = \frac{1-a}{1+a}$$

As it is apparent from the equations described hereinabove, the estimated number of VMs per application class AC(k) depends on a plurality of configuration parameters including the sampling frequency $F_s$ and the unitary cost per execution resource $w_k$. Although all the configuration parameters are defined on per application class basis, the sampling frequency $F_s$ is unique to the system and assigned to comply with Nyquist's stability condition defined as follows:

$$\frac{1-w_k}{F_s} < \pi$$

The parameter $w_k$ is the unitary cost per execution resource instantiated and actually controls the scaling rate. When $w_k$ is close to 1, the cost for scaling execution resources is the highest, disabling de facto the dynamic auto-scaling functionality. On the contrary, a value close to 0 corresponds to the lowest cost. In such a situation, the dynamic auto-scaling typically over-provisions execution resources. A suggested value of 0.5 is an acceptable tradeoff between these two extremes.

Then, the raw estimates—number u1[n] of VMs to be instantiated for each application class—are sent to moving average sub-components 915-916. For each application class AC(k), the raw estimation u1[n] varies with the input load. However, booting up a VM suffers a delay that can be greater than the notification of a new instance. Therefore, to reduce the dependency on the input, a two stages exponential moving average filter (D-EWMA comprising EWMA1 and EWMA2) is used. It will be appreciated by those skilled in the art that the invention is not limited to a two stage exponential moving average filter but that any other suitable multiple stage filter may be implemented. The output from this double exponentially-weighted moving average filter 915-916 is an estimation y[n] that is less sensitive to the input load fluctuations.

The D-EWMA filter comprises two EWMA filters (EWMA1 915 and EWMA2 916) coupled in tandem, each of them having the following recursive form:

$$u2[n]=e_1 \cdot u2[n-1]+(1-e_1) \cdot u1[n]$$

$$y[n]=e_2 \cdot y[n-1]+(1-e_2) \cdot u2[n]$$

The coefficients $e_1$ and $e_2$ are the constant smoothing factors provided as the configuration parameters for the first and second EWMA filter sub-components 915-916.

The received estimation of execution resources u1[n] depends on the sampled input request rate u[n] and is fed into the D-EWMA filter at sampling time $n/F_S$. A first exponentially-weighted moving average sub-component 915 filters the estimation u1[n] with weight $e_1$ to provide a resultant u2[n] (step 1015). Then, the second exponentially-weighted moving average sub-component 916 receives u2[n] and filters this estimation with weight $e_2$ thereby producing y[n] as output. The y[n] output has a floating point representation and is typically rounded in excess to the following smallest integer (ceiling operation) prior to being sent to the following sub-modules 817 and 818 of the real-time controller 812 (step 1016).

After passing through the D-EWMA sub-components 915-916, the estimates are sent to the scheduled provisioning sub-module 817 that typically implements a manual auto-scaling logic to work with the real-time controller 812 to notify a predetermined and scheduled number of execution resources when the value y[n] resulting from the dynamic scaling estimator sub-module 813 is lower than expected for a specified time of the day based on known historical load charges (step 1017). This sub-module 817 compares the estimates to a minimum number of VMs to be instantiated provided as the configuration parameter min_nb_instances. In a case where the estimates are lower than the min_nb_instances parameter, the scheduled provisioning sub-module 817 corrects the estimates and sets them to the min_nb_instances. If the estimates are higher than the min_nb_instances, then the estimates are not corrected. The configuration parameter min_nb_instances can be provided in different ways. For example, but without limiting the generality of the invention, an operator may enter, for each application class AC(k), a time range as well as a minimum number of execution resources to be instantiated for a specified time range. A time range is defined by a pair of epoch_start and epoch_end values with a granularity which is a tradeoff between accuracy and flexibility to avoid the situation where the scheduled provisioning sub-module 817 prevents the dynamic scaling. Additionally and/or alternatively, an operator can also enter a default value specifying the default minimum number of VMs to be instantiated for a particular application class AC(k). This default value can be used as the min_nb_instances configuration parameter for the application class AC(k) outside of the specified time range and/or when a time range was not specified. At configuration time, the operator may enter, for a particular application class AC(k), the triplet (epoch_start, epoch_end, nbScheduled) to associate a minimum number of execution resources to a specified time range.

The output y'[n] from the scheduled provisioning sub-module 817 is then sent to a decimator sub-module 818 (step 1018). As explained hereinabove, the real-time controller module 812 seeks to optimize a local payoff function to reach a global welfare (or equilibrium condition) and minimize a provisioning cost on per application class AC(k) basis dynamically. The real-time controller module 812 receives observable parameters (incoming client requests or incoming traffic arriving at each tier and/or each application class) from the monitor module and therefore, the dynamic scaling estimator sub-module 813 provides raw estimates y[n] for each application class AC(k) every $1/F_s$ second. However, the auto-scaler 812 typically notifies the multi-tiered system to update execution resources allocation and provisioning when a change between any two successive estimates provided by the real-time controller module 812 is actually detected. Therefore, the auto-scaler 812 does not overflow the multi-tiered system with useless and potentially dangerous execution resources allocation and provisioning requests when the estimates did not change. To do so, a decimator sub-module 818 is provided for decorrelating the internal filter estimator sampling rate $F_s$ to the samples notification rate. In particular, if the number of execution resources provisioned does not change, the number of execution resources to be provisioned is notified at regular intervals, e.g. once every scalingDecimationFactor (provided as a configuration parameter) samples, and/or every scalingDecimationfactor/Fs seconds. Otherwise, if a change is detected between two successive estimates, the auto-scaler 812 notifies immediately the multi-tiered system. In such a situation, the decimator sub-module counter is restarted.

Those skilled in the art will appreciate that although portions of the auto-scaler 110 (such as the workload monitor module 111 and the controller module 112) and embodiments in the drawings (FIGS. 8, 9 and 11) are shown as comprising a number of separate functional (sub-) modules or (sub-) components, these (sub-) modules or (sub-) components are not necessarily separate physical entities, but rather represent different computing tasks or data objects. These computing tasks and/or data objects may be stored in a memory that is accessible by a processor, both of them being part of the auto-scaler 110. These tasks may be carried out in software running on a single processor, or on multiple processors. The software may be provided to the processor or the processors on tangible media, such as CD-ROM or non-volatile memory.

Table 2 describes the different configuration parameters explained hereinabove:

TABLE 2

| Configuration parameters | | |
|---|---|---|
| Name | Description | Value Range |
| SamplingFrequency_in_Hertz | $F_s$ or Sampling Frequency (in Hertz) | ]0; ∞[ |
| unitaryCost_per_vm | $w_k$ or unitary cost per execution resource | ]0; 1[ |
| ewma1 | $e_1$ or smoothing factor $1^{st}$ stage | ]0; 1[ |
| ewma2 | $e_2$ or smoothing factor $2^{nd}$ stage | ]0; 1[ |
| max_nb_requests_per_sec | Maximum number of requests per second | ]0, ∞[ |
| scalingDecimationFactor | Decimation factor | [1; ∞[ |
| (epoch_start; epoch_end; | Scheduled | [00:00; 23:59] |

TABLE 2-continued

| Configuration parameters | | |
|---|---|---|
| Name | Description | Value Range |
| nbScheduled) min_nb_instances | provisioning triplet Minimum number of scheduled resources | ]1; ∞[ |

An example of configuration parameters set for different application classes is given in the script below:

```
{
  "logic": "BLogic",
  "metric_url_root": "http://metrics.core/core/metrics/v0.1/",
  "deploy_url_root": "http://deploy.ssid.solar4tv.com/deploy/v1/ssids/stable.solar/",
  "SamplingFrequency_in_hz": 0.333,
  "unitaryCost_per_vm": 0.5,
  "ewma1": 0.9,
  "ewma2": 0.7,
  "scalingDecimationfactor": 10,
  "application_classes": [
    {
      "name": "coretvsearchapp",
      "max_nb_requests_per_sec": 150,
      "unitary_cost_per_vm": 0.6,
      "min_nb_instances": [{"start":"11:50","end":"12:25","nb":2},
      {"start":"17:52","end":"18:14","nb":4},
      {"start":"20:20","end":"22:05","nb":5}],
      "default_min_nb_instances":2,
    },
    {
      "name": "coronaclimcs",
      "max_nb_requests_per_s": 50,
      "unitary_cost_per_vm": 0.3
    }
  ]
}
```

In this example, some configuration parameters are set for two different application classes entitled "coretvsearchapp" and "coronaclimcs". The default configuration parameters are then set such as the:

sampling frequency set to 0.333 Hz;
unitary cost per VM set to 0.5;
smoothing factors ewma1 set to 0.9 and ewma2 set to 0.7; and
decimation factor set to 10.

Then, additional configuration parameters are associated to the description of the application classes and some of them may override the default values. Therefore, for both application classes defined in the example, the unitary cost per VM is set according to the configuration parameters provided in the application class descriptions.

Figure 12A:
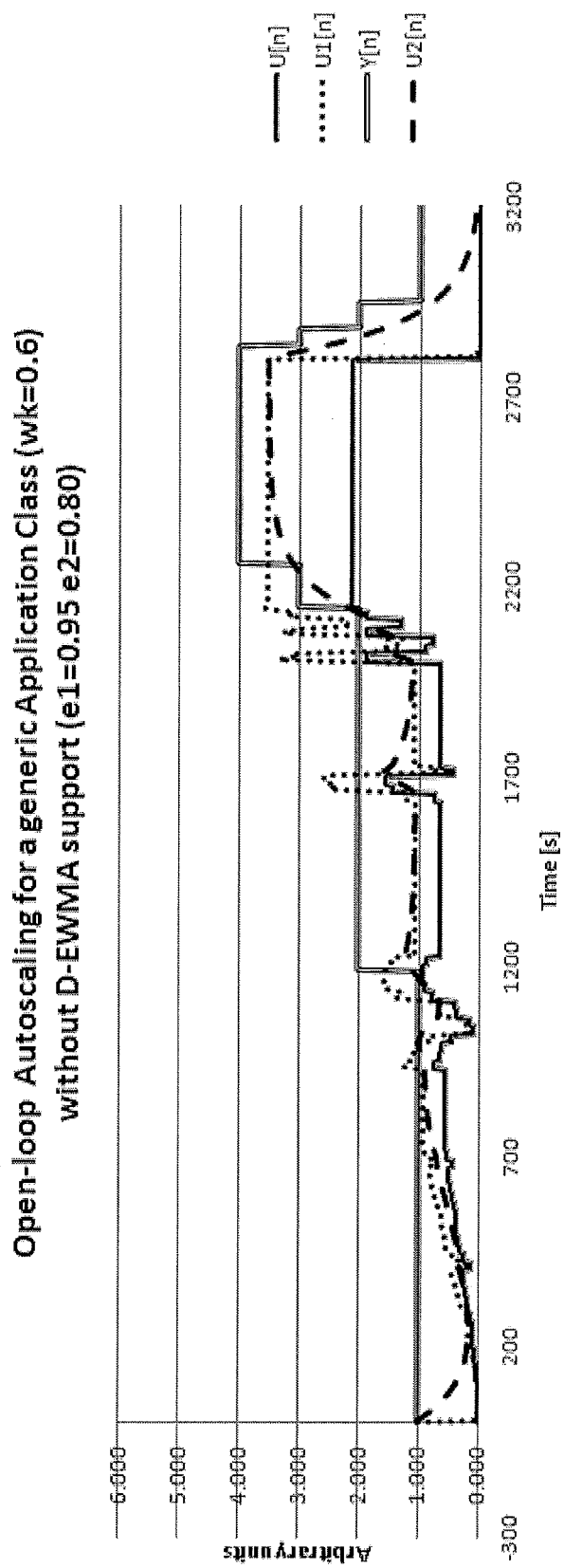
FIGS. 12a and 12b are graphical illustrations of dynamic scaling provisioning of execution resources over the time for a particular application class in accordance with a further embodiment of the present invention.
Figure 12B:
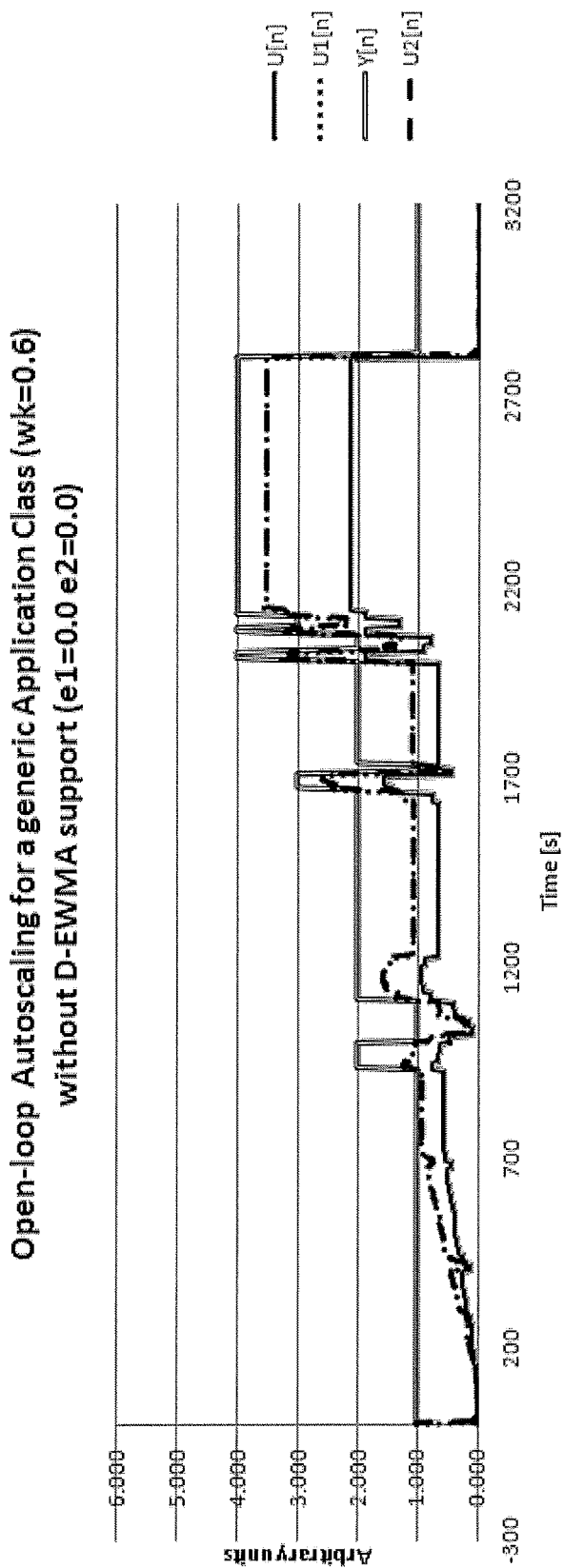

Reference is now made to FIGS. 12A and 12B which are graphical illustrations of dynamic scaling provisioning of execution resources over the time for a particular application class in accordance with a further embodiment of the present invention.

FIGS. 12A and 12B are graphical illustrations showing the effect of the D-EWMA sub-components 915-196 of the dynamic scaling estimator sub-module 813 for an open-loop strategy. In both situations, the execution resources provisioning operation for a generic application class AC(k) (including intermediate values u1[n] and u2[n]) is shown for:

a same normalized input load v[n]; and
a constant unitary cost per execution resource instantiated parameter $w_k$, where $w_k$=0.6.

As shown in FIG. 12B, when the smoothing factors $e_1$ and $e_2$ equal zero, the output from the dynamic scaling estimator sub-module 813 $y_k[n]$ varies quite often. On the contrary, when $e_1=0.95$ and $e_2=0.8$, the output $y_k[n]$ is more stable. Therefore, the auto-scaler prevents the multi-tiered system from overflowing with idle and potentially dangerous execution resources allocation and provisioning requests. It is recalled that the auto-scaler notifies the multi-tiered system to update execution resources allocation and provisioning when a change between any two successive estimates provided by the real-time controller module is actually detected.

In another embodiment of the present invention, the strategy adopted by each application class AC(k) part of the multi-tiered system is a hybrid strategy comprising an open-loop strategy associated to a feedback strategy. In a feedback strategy, the control variable depends on the time and also on a state variable. Therefore, a dependency to an observable state parameter $x(t)$ for the control variable such as the CPU, I/O, memory usage, etc. is introduced and the control variable is denoted by $n_k(t; x(t))$. Combining these strategies contributes to remedy some limitations of the open-loop strategy such as the implicit over-provisioning or the latency to reach steady conditions and stable operations. In open-loop strategy, $w_k$ is a constant configuration parameter that, among other things, determines the cut-off frequency for the low pass filter. In a feedback strategy, the low pass filter cut-off frequency is typically controlled by a parametric design. Also, in the electrical analogy, the feedback strategy is equivalent to change the RC block into variable components that depend on external state variables.

In a further embodiment of the present invention, the strategy adopted by each application class AC(k) part of the multi-tiered system is another hybrid strategy comprising an open-loop strategy associated to a scheduled provisioning strategy. A scheduled provisioning strategy ensures that a proper number of VMs, assigned statically by an operator, is instantiated at a scheduled time of the day. Indeed, in some particular or predictable situations such as sports (e.g. Olympic games or football match) or daily events (e.g. 8.00 pm evening news), the number of execution resources required are known in advance through capacity planning techniques. In these situations, the provisioning rate change does not follow a daily pattern and the operator may therefore decide to set the default lower min_nb_instances configuration parameter to a higher value. This is a heuristic design that typically works with the dynamic auto-scaling and avoids anticipating high input load to support rare but known events.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

Also, it will be appreciated by persons skilled in the art that the present invention is not limited to what has been particularly shown and described hereinabove. Rather the scope of the invention is defined by the appended claims and equivalents thereof.

The invention claimed is:

1. A method comprising:
monitoring workloads of a plurality of application classes, each of said application classes describing services provided by one or more applications in a multi-tiered system, and each of said application classes comprising a plurality of instantiated execution resources;
estimating, for each of said application classes, a number of execution resources able to handle said monitored workloads, to simultaneously maintain a multi-tiered system response time below a determined value and minimize a cost per execution resource, wherein said multi-tiered system response time is maintained below the determined value and said cost per execution resource is minimized by optimizing a payoff function defined for each of said application classes, wherein said payoff function defined for each of said application classes depends on:
a workload arriving at an application class;
a local response time of said application class; and
a unitary cost for instantiating an execution resource for said application class; and
for each one application class of said plurality of application classes:
dynamically adjusting said plurality of instantiated execution resources comprised in said one application class based on said estimated number of execution resources, said dynamically adjusting comprises increasing or decreasing the number of execution resources for an application class for said monitored workload for said application class.

2. The method of claim 1, wherein said estimating comprises a minimal over-provisioning to account for unpredictable burst workload for each of said application classes.

3. The method of claim 1, wherein said local response time of said application class is estimated as a ratio of a number of requests waiting to be served by a plurality of execution resources instantiated for said application class to said workload of said application class.

4. The method of claim 1, wherein said multi-tiered system response time is computed as a cumulative sum of local response times of all application classes belonging to said multi-tiered system.

5. The method of claim 1, wherein said determined value for a multi-tiered system response time is specified by an operator in a service level agreement contract.

6. The method of claim 1, wherein said estimating further comprises:
providing first estimates for each of said application classes of a number of execution resources able to handle said monitored workload; and
providing second estimates for each of said application classes by applying weighting factors to said first estimates.

7. The method of claim 6, wherein said second estimates are provided using a double exponentially-weighted moving average filter.

8. The method of claim 1, wherein said estimating further comprises:
associating a set of parameters to one or more application classes of said multi-tiered system; and
correcting, for one or more application classes, said estimated number of execution resources able to handle said monitored workloads according to said set of parameters.

9. The method of claim 8, wherein said set of parameters characterizes an application class and comprises at least one of the following:
a maximum number of requests that said application class is able to handle per second;
a unitary cost for instantiating an execution resource;
a default minimum number of execution resources to be instantiated; and at least one time range associated with a minimum number of execution resources to be instantiated.

10. The method of claim 9, wherein said correcting comprises using said default minimum number of execution resources to be instantiated if said estimating is lower than said default minimum number of execution resources to be instantiated.

11. The method of claim 9, wherein said correcting comprises using said minimum number of execution resources to be instantiated if said estimating is lower than said minimum number of execution resources to be instantiated for said at least one time range.

12. The method of claim 1, wherein said dynamically adjusting is performed, for each of said application classes, only when a change is detected between two consecutive estimated number of execution resources.

13. An auto-scaler device comprising a processor, said processor being operating to:
   monitor workloads of a plurality of application classes, each of said application classes describing services provided by one or more applications in a multi-tiered system and each of said application classes comprising a plurality of instantiated execution resources instantiated;
   estimate, for each of said application classes, a number of execution resources able to handle said monitored workloads, to simultaneously maintain a multi-tiered system response time below a determined value and minimize a cost per execution resource, wherein said multi-tiered system response time is maintained below the determined value and said cost per execution resource is minimized by optimizing a payoff function defined for each of said application classes, wherein said payoff function defined for each of said application classes depends on:
   a workload arriving at an application class;
   a local response time of said application class; and
   a unitary cost for instantiating an execution resource for said application class; and
   for each one application class of said plurality of application classes, to dynamically adjust said plurality of instantiated execution resources comprised in said one application class based on said estimated number of execution resources by increasing or decreasing the number of instantiated execution resources for said one application class.

14. One or more computer readable non-transitory tangible storage media encoded with software comprising computer executable instructions being operative, when the software is executed by a processor, to:
   monitor workloads of a plurality of application classes, each of said application classes describing services provided by one or more applications in a multi-tiered system, and each of said application classes comprising a plurality of instantiated execution resources;
   estimate, for each of said application classes, a number of execution resources able to handle said monitored workloads, to simultaneously maintain a multi-tiered system response time below a determined value and minimize a cost per execution resource, wherein said multi-tiered system response time is maintained below the determined value and said cost per execution resource is minimized by optimizing a payoff function defined for each of said application classes, wherein said payoff function defined for each of said application classes depends on:
   a workload arriving at an application class;
   a local response time of said application class; and
   a unitary cost for instantiating an execution resource for said application class; and
   for each one application class of said plurality of application classes: dynamically adjust said plurality of instantiated execution resources comprised in said one application based on said estimated number of execution resources, said dynamically adjusting comprising adjusting said plurality of instantiated execution resources by increasing or decreasing the number of instantiated execution resources for said one application class.

* * * * *